(12) United States Patent
Hiraishi

(10) Patent No.: US 6,519,364 B1
(45) Date of Patent: Feb. 11, 2003

(54) METHOD AND APPARATUS FOR RECOGNIZING IMAGES, AND COPYING MACHINE AND PRINTER USING THE SAME

(75) Inventor: Junji Hiraishi, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 09/142,754

(22) PCT Filed: Mar. 26, 1997

(86) PCT No.: PCT/JP97/01006

§ 371 (c)(1),
(2), (4) Date: Sep. 14, 1998

(87) PCT Pub. No.: WO97/36417

PCT Pub. Date: Oct. 2, 1997

(30) Foreign Application Priority Data

Mar. 27, 1996 (JP) ............................................. 8-095910

(51) Int. Cl.$^7$ ................................................. G06K 9/46
(52) U.S. Cl. ..................... 382/203; 358/1.17; 358/3.28; 382/135; 382/137; 382/165
(58) Field of Search ................................. 382/135, 137, 382/165, 217, 227, 298; 399/366; 358/1.13, 1.15, 1.16, 1.17

(56) References Cited

U.S. PATENT DOCUMENTS

| | | | | |
|---|---|---|---|---|
| 5,216,724 A | * | 6/1993 | Suzuki et al. | 382/135 |
| 5,504,822 A | * | 4/1996 | Holt | 382/218 |
| 5,638,498 A | * | 6/1997 | Tyler et al. | 358/1.18 |
| 5,696,542 A | * | 12/1997 | Matsubara | 347/12 |
| 5,790,932 A | * | 8/1998 | Komaki et al. | 399/366 |
| 5,845,008 A | * | 12/1998 | Katoh et al. | 382/217 |
| 5,991,515 A | * | 11/1999 | Fall et al. | 358/1.15 |
| 6,052,140 A | * | 4/2000 | Yoshida | 347/234 |
| 6,091,512 A | * | 7/2000 | Sasanuma et al. | 358/1.9 |
| 6,120,141 A | * | 9/2000 | Tajika et al. | 347/96 |

FOREIGN PATENT DOCUMENTS

| | | |
|---|---|---|
| JP | A-63-152266 | 6/1988 |
| JP | A-5-14610 | 1/1993 |
| JP | A-7-162677 | 6/1995 |
| JP | A-7-288681 | 10/1995 |

* cited by examiner

Primary Examiner—Bhavesh Mehta
Assistant Examiner—Gregory Desire
(74) Attorney, Agent, or Firm—Dickstein Shapiro Morin & Oshinsky LLP

(57) ABSTRACT

A copying machine obtains image data on the basis of a strip-shaped region by reading portion 10, converts the image data to YMCK data at image processing portion 20 in the succeeding stage, and performs zooming processing at zooming processing portion 22. YMCK binary data is produced by pseudo tone processing portion 24. Output portion 30 sequentially prints out data on the basis of a strip-shaped region based on the produced binary data. The output of the image processing portion is divided into 64 dot portions for a reduction processing (into 128 dot portions for equal size/expansion processing). Then, the output of the image processing portion is applied to a recognizing device 50, which performs recognizing processing based on data after a zooming operation. As a result, any copying machine printing out data for each prescribed region while reading the data on the basis of a strip-shaped region smaller than the entire original may surely detect image data including a particular image (particular pattern).

20 Claims, 23 Drawing Sheets

8mm WIDE
128DOTS
AT 400dpi

READING PORTION

OUTPUT PORTION

FIG.10

| MAGNIFICATION [%] | NUMBER OF DOTS USED BY READING SENSOR | NUMBER OF DOTS MOVED IN READING SENSOR PAGE SCANNING DIRECTION | NUMBER OF DOTS FOR PRODUCING DATA FOR PRINTING HEAD |
|---|---|---|---|
| 50 | 128 | 128 | 64 |
| 75 | 85 | 85 | 64 |
| 80 | 80 | 80 | 64 |
| 90 | 71 | 71 | 64 |
| 100 | 128 | 128 | 128 |
| 120 | 106 | 106 | 128 |
| 150 | 85 | 85 | 128 |
| 180 | 71 | 71 | 128 |
| 200 | 64 | 64 | 128 |

| f | e | d | e | f |
|---|---|---|---|---|
| e | c | b | c | e |
| d | b | A(a) | b | d |
| e | c | b | c | e |
| f | e | d | e | f |

EXAMPLES OF COEFFICIENTS
a = 11
b = 6
c = 3
d = 2
e = 1
f = 0

*FIG.16*

| (xi,yj) | → X | | | | |
|---|---|---|---|---|---|
| (0,0) | (1,0) | (2,0) | (3,0) | (4,0) | (5,0) |
| (0,1) | (1,1) | (2,1) | (3,1) | (4,1) | (5,1) |
| (0,2) | (1,2) | (2,2) | (3,2) | (4,2) | (5,2) |

↓ Y

| (0,127) | (1,127) | (2,127) | (3,127) | (4,127) | (5,127) |
|---|---|---|---|---|---|

*FIG.17*

(yj,xi) LOWER ADDRESSES IN MEMORY

| HIGHER ADDRESSES IN MEMORY | (0,0) | (1,0) | (2,0) | (3,0) | (4,0) | |
|---|---|---|---|---|---|---|
| (0,1) | | | | | | |
| (0,2) | | | | | | |
| | | | | | | |
| | | | | | | |

FIG.25A

400dpi

| (1) | (2) | (3) | (4) |
|---|---|---|---|
| (5) | (6) | (7) | (8) |
| (9) | (10) | (11) | (12) |
| (13) | (14) | (15) | (16) |

100dpi $$\frac{\Sigma \ (1) \sim (16)}{16}$$

METHOD AND APPARATUS FOR RECOGNIZING IMAGES, AND COPYING MACHINE AND PRINTER USING THE SAME

TECHNICAL FIELD

The present invention relates generally to a method and an apparatus for recognizing images, and a copying machine and a printer using the same.

BACKGROUND ART

In a reading portion in a general digital color copying machine (laser type), as shown in FIG. 1, an image sensor 1 formed by a line of CCDs having a reading width identical to the width of an original 2 is used and provided opposing the original. In this example, the width d of image sensor 1 in practice is smaller than the width D of the original, since a reducing optics including a lens 3 is used, but in some other cases, the same width is employed. If the lengthwise direction of image sensor 1 is set as a main scanning direction, image sensor 1 may be moved back and forth in a sub scanning direction orthogonal to the main scanning direction.

In reading an original using such image sensor 1, the entire raster scan method is employed. More specifically, as shown in FIG. 2, image sensor 1 is positioned at the top of original 2, and the first line a (in the main scanning direction) is read by image sensor 1. Then, image sensor 1 is moved by 1 line in the sub scanning direction, and the next line b (in the main scanning direction) is read. Thereafter, the process is sequentially repeated to read the entire original, based on which a prescribed image processing is performed for printing.

The copying machine employing the kind of entire raster scanning method as described above is capable of copying data in very high precision, and therefore a printed, out copy could be almost identical to the original. The machine could be therefore used to counterfeit anything prohibited to copy such as paper currencies.

Hence, in order to prevent such misconduct, an image recognizing apparatus to recognize particular kinds of originals is installed and image data read by image sensor 1 is subjected to a recognizing process, so that the presence/absence of a particular pattern printed on any items, i.e., a pattern prohibited to copy, is determined. If the particular pattern is detected, output is stopped, or a prescribed prohibiting process such as painting out is performed.

Meanwhile, there are other color copying machines than the digital color-copying machine such as ink jet type machine. The method of reading images by this type of copying machine is as shown in FIGS. 3A and 3B. More specifically, an image sensor 5 of a small width is provided opposite to original 2. Image sensor 5 is capable of reading 128 dots at 400 dpi. There are further provided an X motor for moving image sensor 1 in the X-direction and a Y motor for movement in the Y-direction, and revolution of each of the motors is controlled to move image sensor 5 to an arbitrary position in a two-dimensional plane of original 2.

In reading image data, the X motor is normally rotated to move image sensor 5 in the X-direction, from position X0 to position of Xn. During the movement, image data at an opposing portion (a reading region a in the first line) is read. Then, the X motor is reversely rotated, and the Y motor is rotated by a prescribed angle in the normal direction to move image sensor 5 obliquely as shown in broken line in the figure, and positioned at the head (X0) of reading region b in the second line. Then, the Y motor is stopped, and the X motor is normally rotated to move image sensor 5 from position X0 to position Xn in reading region b in the second line. During the movement, image data in the opposite portion (region b) is read.

Thereafter, by repeating the above process, the entire original is read. Reading of images on the basis of each region a, b . . . is by raster scanning in a stripped shaped region as shown in FIG. 4. (The solid line arrows in the figure denote periods of reading images, and the line connecting the adjacent arrows represents the image sensor in the process of moving, and data of each pixel is read following the arrows.)

In printing out, each time one region is read, an image corresponding to the region is formed by a prescribed image processing, and the thus formed image for the one region is output. More specifically, as shown in FIG. 5, reading data for one region (region a in the first line in the shown example) is applied from the reading portion including image sensor 5 to image processing portion 6, where a prescribed image processing is performed, data for one region is applied to the output portion, and data corresponding to a region a' for the read region a is printed using a printing head 7 (equal size printing). Thus, image reading and image formation are linked to print data bit by bit, so that an inexpensive, small memory copying machine may be implemented.

Furthermore, printing head 7 provided at the output portion has 128 nozzles for one color component corresponding to the reading portion, and the on/off of the color component for the corresponding nozzles is controlled based on the color of each pixel detected by the detection element of a corresponding sensor.

The above ink jet type color copying machine is not provided with an image recognizing apparatus such as those installed in a conventional laser type digital color copying machine for recognizing special kinds of originals.

However, in recent years, the above-described ink jet type color printer came to be capable of highly precise color printing, and therefore the sameness between an original and a copy thereof is increased. Thus, there is a need for an image recognizing apparatus for recognizing particular kinds of originals. As described, however, the image recognizing apparatus that has been used in the entire raster scanning digital color copying machine cannot be applied as is, because of the difference in the scanning method.

Furthermore, since the operation of the reading portion in the process of expansion/reduction is different between these copying machines, the above-described problem is more notable. More specifically, in the digital color-copying machine, as shown in FIGS. 1 and 2, image sensor 1 moves only in a single direction. As a result, the resolution in reading an original in the width-wise direction (in the arranging direction of image sensor 1/the main scanning direction) is constant regardless of the expansion/reduction ratio. The resolution in reading in the sub scanning direction is changed by expansion/reduction. More specifically, the moving speed of image sensor 1 in the sub scanning direction is lowered in the expansion process, and raised in the reduction process, and the speed is adjusted by the expansion/reduction ratio. Such simple movement allows image data with the same resolution to be available regardless of the magnification simply by thinning and supplementing image data read in the sub scanning direction as necessary.

In contrast, in the ink jet type machine, 128 nozzles provided at printing head 7 are controlled at a time for output, during reading a strip-shaped region, data from the head to N-th data is used, while N+1-th data and on is not used, and the Y motor is rotated to move image sensor 1 for a distance corresponding to the N pieces of data in the image sensor, in order to read the next strip-shaped region (the specific process of which will be described later).

Therefore, part of an output signal from image sensor 1 is invalidated, the moving distance in the Y-direction is not constant, unlike the reading mechanism of the conventional digital color copying machine, and the conventional recognizing apparatus as is cannot be applied.

Furthermore, in the sub scanning direction, the moving speed of the image sensor is changed depending upon the magnification, as is the case with the laser type apparatus. Accordingly, read data is two-dimensionally changed depending upon the magnification, and the same image data is not available depending upon the magnification, simply by thinning or supplementing the read data in the order of application.

The present invention is in view of the above-described background, and it is an object of the present invention to provide a method and an apparatus which can be used even in a copying machine and a printer such as an inkjet type machine which reads (externally receives) data in a strip-shaped region smaller than the entire original, and produces printing data based on applied image data for output, and to provide a copying machine and a printer employing such method and apparatus which permit data including particular data (particular patterns) to be surely detected.

Another object of the present invention is to provide a method and an apparatus permitting zooming process in addition to the above object of the invention.

DISCLOSURE OF THE INVENTION

In order to achieve the above-described objects, an image recognizing apparatus according to the present invention including an image processing portion which produces printing data based on input image data for output to an output portion includes a recognizing apparatus which recognizes particular images.

Image data input to the image processing portion is sequentially input in the form of a number of strip-shaped small regions formed by dividing the entire image by scanning the entire image. The output portion sequentially outputs image data as a prescribed number of lines of strip-shaped data based on the output of the image processing portion, the recognizing apparatus detects particular images from an amount of said image data produced by a plurality of scanning operations, compares the data with internally stored data and applies the result to said output portion.

The entire image is divided into small regions and input to the image processing portion, where the recognizing apparatus detects if the input image data is any of particular images. As a result, a particular document may be detected without providing an image memory for 1 page to read the entire image.

According to another aspect of the invention, in the image recognizing apparatus, the image processing system is provided with an image reading portion (reading portion 10) which reads an image on the basis of a strip-shaped small region (each region extending in the sub scanning direction) for the entire image reading region, and image processing unit (image processing portion 20) which produces printing data based on image data output from the image reading portion for output. In further detail, the image processing system to which the present invention portion for output. In further detail, the image processing system to which the present invention is applied has a zooming function, and the zooming process operates to satisfy the following requirements (1) to (3).

(1) The substantial reading width of said strip-shaped small region is changed depending upon the magnification.

(2) The widths of printing data available by expansion are equal regardless of the magnification (constant 128 dots in the embodiment).

(3) The width of printing data available by reduction is equal regardless of the magnification (constant 64 dots in the embodiment).

The image recognizing apparatus in the image processing system which recognizes a particular image in said read image data ("particular mark M, particular pattern" in the embodiment) performs a prescribed recognizing processing based on image data after zooming operation produced in said image processing unit, on the basis of a strip-shaped small region less than one original page, and recognizes said particular image, and includes recognizing unit for recognizing said particular image and output unit for outputting the result of recognition by said recognizing unit. Note that in this embodiment, the recognizing unit and output unit are collectively referred to as recognizing apparatus 50, 50' or 50".

The image processing system to which the present invention is applied is not limited to the above, and the invention is applicable to any system which receives data from an external apparatus, and includes image processing unit for producing printing data based on the received image data for output, and the zooming processing by said image processing system may be the process satisfying the following requirements (1) to (3).

(1) The substantial reading width of said strip-shaped small region is changed depending upon the magnification.

(2) The widths of printing data available by expansion are equal regardless of the magnification.

(3) The widths of printing data available by reduction are equal regardless of the magnification.

Note that the zooming process is not essential in the above image processing system, and the above elements may be arbitrarily combined. Various combinations of the above elements are given in the following embodiments.

Preferably, said printing data is binary data representing whether or not to output ink corresponding to each color component, and said recognizing unit performs a recognizing processing based on multi-value image data produced in said image processing unit after zooming operation and before producing said binary data. The image data used for said recognizing process may be a signal that specifies a color component other than optical color information such as YMC data and YMCK data.

Meanwhile, in the image recognizing method according to the present invention, an image is read on the basis of a plurality of parallel strip-shaped small regions for the entire image reading region, and printing data is produced based on the resulting image data for output. If said printing data is produced by zooming process, the following requirements (1) to (3) are satisfied.

(1) The substantial reading width of said strip-shaped small region is changed depending upon the magnification.

(2) The widths of printing data available by expansion are made equal regardless of the magnification.

(3) The widths of printing data available by reduction are made equal regardless of the magnification.

A prescribed recognizing processing is performed based on image data after zooming operation, on the basis of a strip-shaped small region less than one original page, and a particular image included in said image data is recognized.

As an alternative solution, image data is received from an external device on the basis of a plurality of parallel strip-shaped small regions for an image region to be printed out. Then, printing data is basically produced and output based on the received image data. If the zooming processing is performed to produce said printing data, the following requirements (1) to (3) are satisfied.

(1) The substantial reading width of said strip-shaped small region is changed depending upon the magnification.

(2) The widths of printing data available by expansion are made equal regardless of the magnification.

(3) The widths of printing data available by reduction are made equal regardless of the magnification.

A prescribed recognizing processing is performed based on image data after the zooming processing, on the basis of a strip-shaped small region less than one original page, and a particular image included in said image data is recognized.

More preferably, said printing data is binary data representing whether or not to output ink corresponding to each color component produced in said image processing unit after zooming processing, and a prescribed recognizing processing is performed based on multi-value image data before producing said binary data, in order to recognize said particular image. Said recognizing processing may be performed based on image data of signals that specify a color component other than optical color information (RGB data) such as YMC data and YMCK data.

According to the present invention, in a copying machine which performs a zooming processing to image data applied on the basis of a strip-shaped small region, produces printing data, and performs a printing processing based on the printing data on the basis of a strip-shaped small region, there is provided an image recognizing apparatus for recognizing a particular image on the basis of a strip-shaped small region less than one original page, using the data after the zooming processing, and outputting is prohibited if the particular image is recognized by the recognizing apparatus.

Also according to the present invention, in a printer which performs a zooming processing to image data applied on the basis of a strip-shaped small region, produces printing data, and performs a printing processing on the basis of a strip-shaped small region based on the produced printing data, there is provided an image recognizing apparatus for recognizing a particular image, using the data after the zooming operation, and outputting is prohibited, if the particular images recognized by the recognizing apparatus.

In summary, according to the present invention, the recognizing processing is based on data without zooming processing or after zooming operation. More specifically, in an ink jet type copying machine or printer, unlike a laser type printer, printing data is produced for each image data available from a small region specified by main scanning and sub scanning operations, and printing processing is performed. In the zooming processing, the substantial reading width varies depending upon the magnification. (In the embodiment, image data read by the reading portion is 128-dot data similarly to the case of equal size printing, but the substantial reading width is reduced, because image data for dots beyond N dots from the head is not used.) Thus, on the side of the read image data, data changes depending upon the magnification, the width of data after zooming processing is specified into two kinds, the case of reduction and the case of expansion.

As a result, corresponding operations are alleviated. By obtaining information as to whether the zooming processing is for expansion or reduction, the algorithm is switched between prepared recognizing algorithms for prescribed processing. Since prescribed recognizing processing is performed to image data after a zooming operation, the same apparatus may be used for a printer that does not have a reading portion.

Terms used herein will be now defined.

In the specification, as shown in FIG. 6, the scanning direction A of sensor 5 itself is specified as a main scanning direction, and the direction B in which the sensor moves for reading a strip-shaped region is specified as a sub scanning direction. Thus, the sensor is moved in the sub scanning direction while reading an image in the main scanning direction and image data in a strip-shaped region is read as raster-scanned. Furthermore, the movement of the sensor in synchronization with the printing head, in other words the movement C of the printing head for reading the next strip-shaped region is specified as page-scanning.

The zooming processing includes expansion and reduction processing. The zooming operation includes not only such expansion/reduction processing but also equal-size processing wherein the magnification is 100%, or processing without zooming processing.

The output prohibiting processing includes not only stopping outputting, but also painting in solid black all over or outputting anything different from the original such as the case of printing a special design over the original image.

BRIEF DESCRIPTION OF THE DRAWINGS

FIG. 10 is a diagram for use in illustration of expansion/reduction processing.

FIGS. 16 and 17 are diagrams for use in illustration of the function of a buffer control portion.

FIGS. 25A and 25B are diagrams for use in illustration of the function of a thinning portion.

BEST MODE FOR CARRYING OUT THE INVENTION

Figure 1:
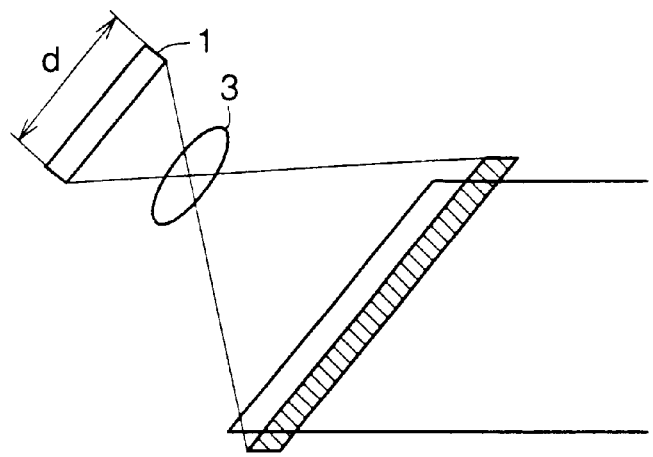
FIG. 1 is a diagram showing an example of the configuration of a reading portion in a conventional digital color-copying machine.
Figure 2:
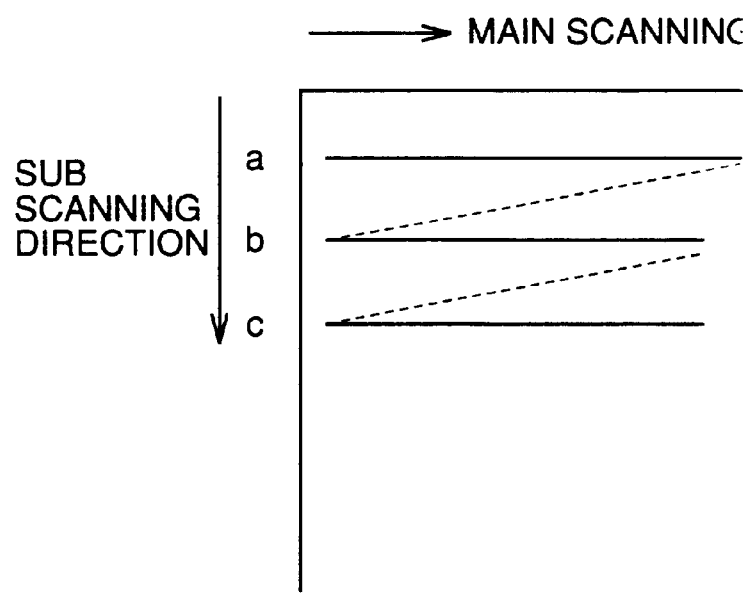
FIG. 2 is a diagram for use in illustration of a method of scanning in a digital color-copying machine.
Figure 3A:
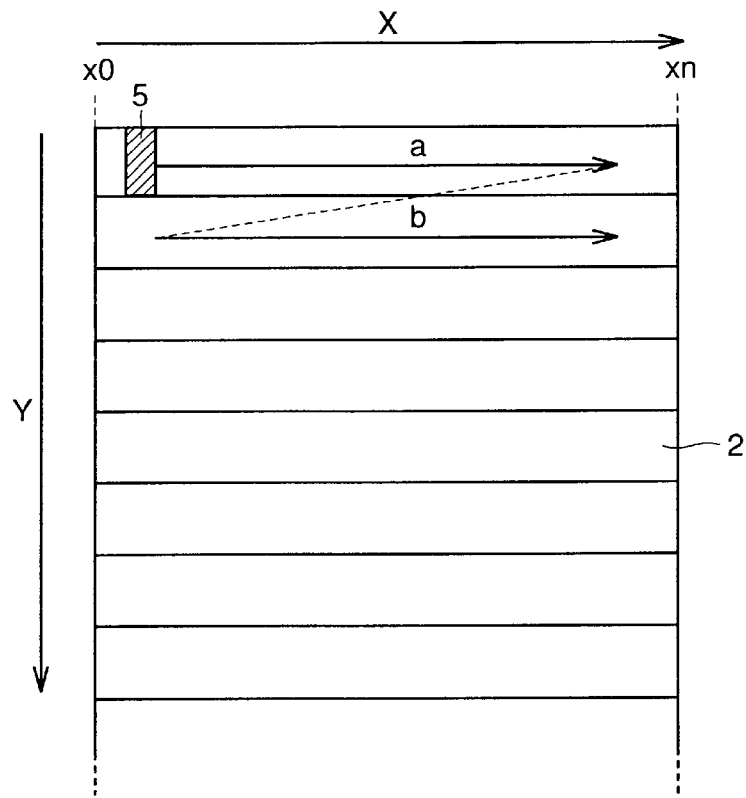
FIGS. 3A and 3B are diagrams for use in illustration of a method of scanning in an ink jet type-copying machine to which the present invention is applied.
Figure 3B:
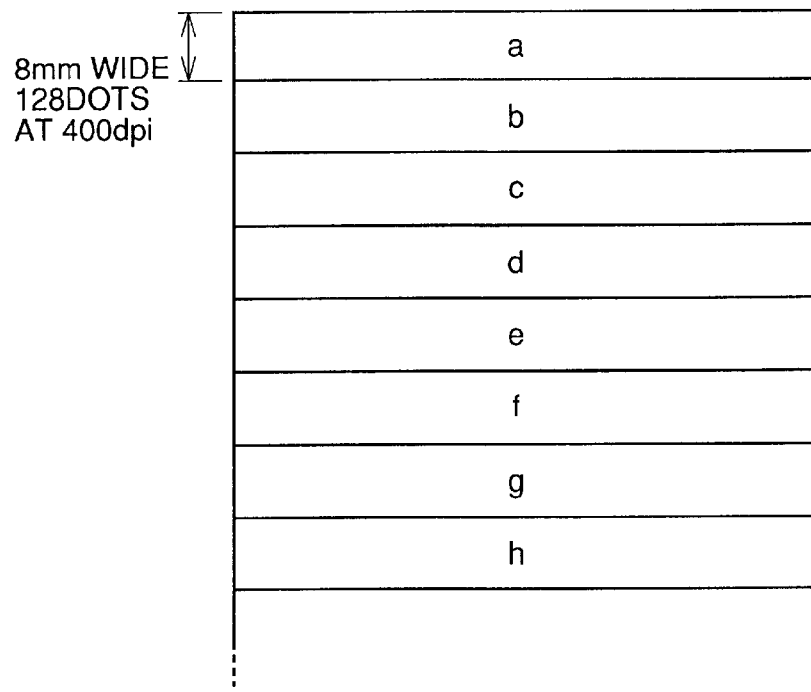
Figure 4:
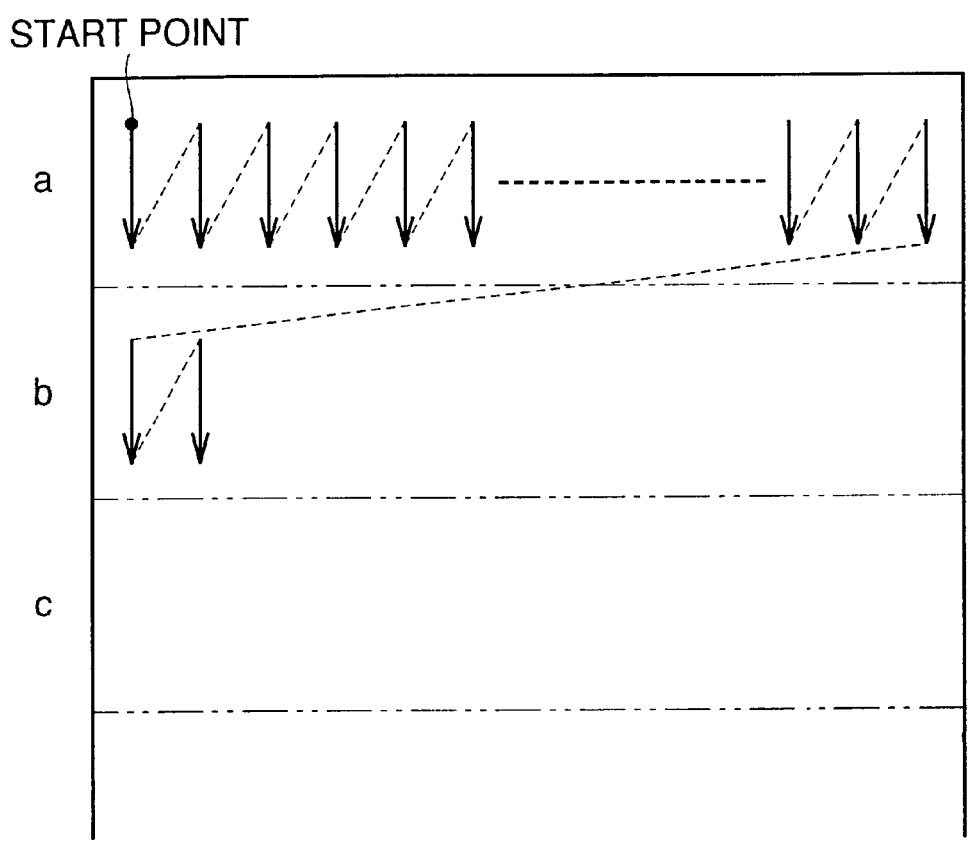
FIG. 4 is a diagram for use in illustration of a scanning method in an ink jet type-copying machine to which the present invention is applied.
Figure 5:
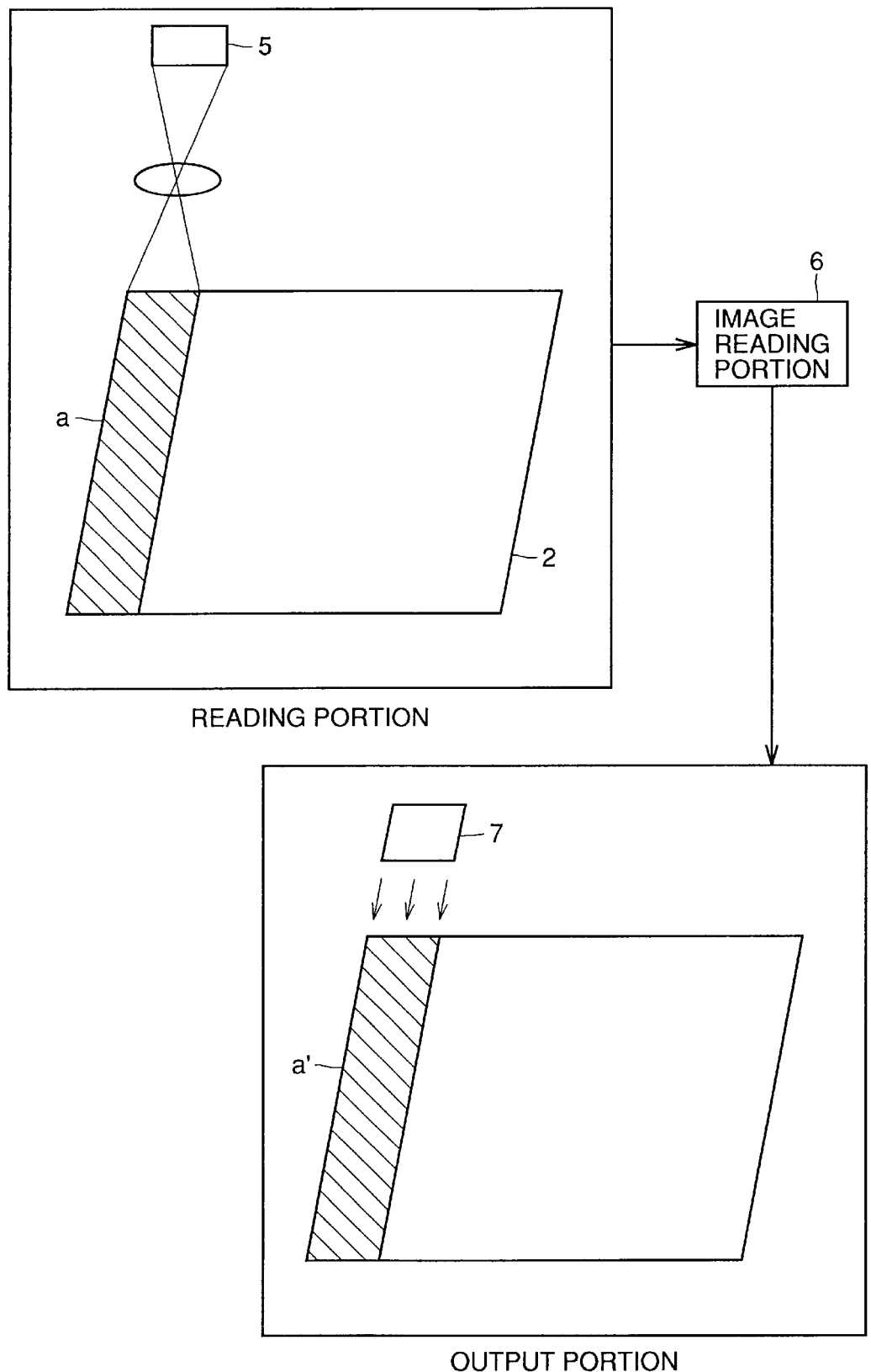
FIG. 5 is a diagram showing a general structure of an ink jet type-copying machine.
Figure 6:
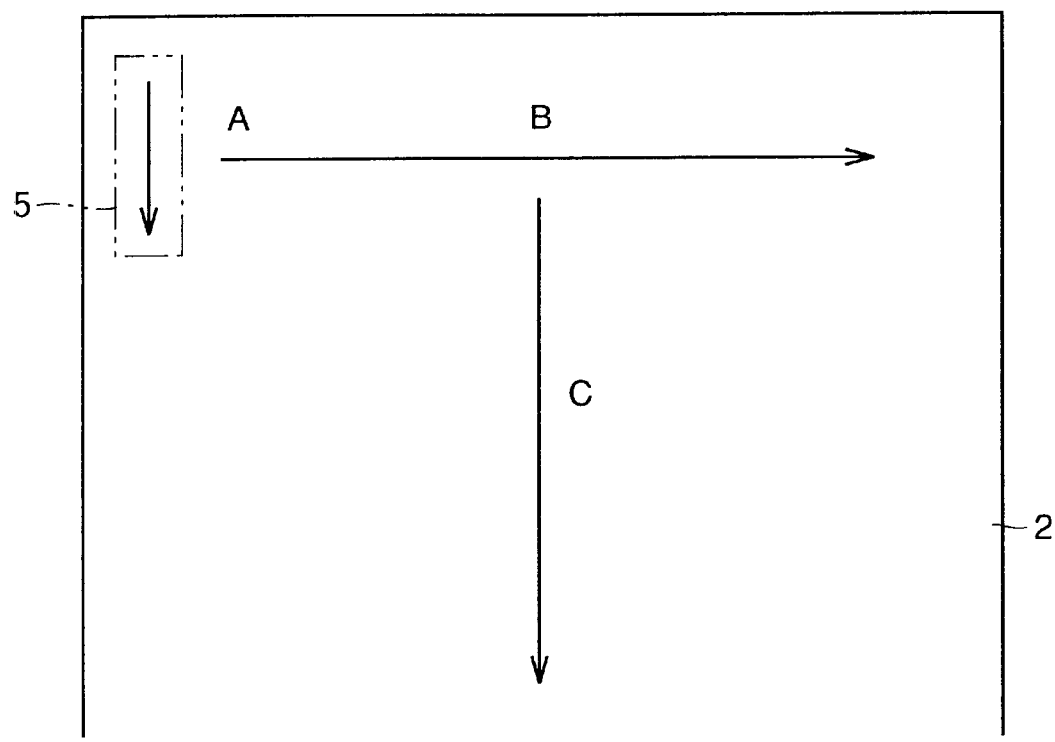
FIG. 6 is a diagram for use in illustration of the definition of a scanning direction during scanning in an ink jet type-copying machine to which the present invention is applied.
Figure 7:
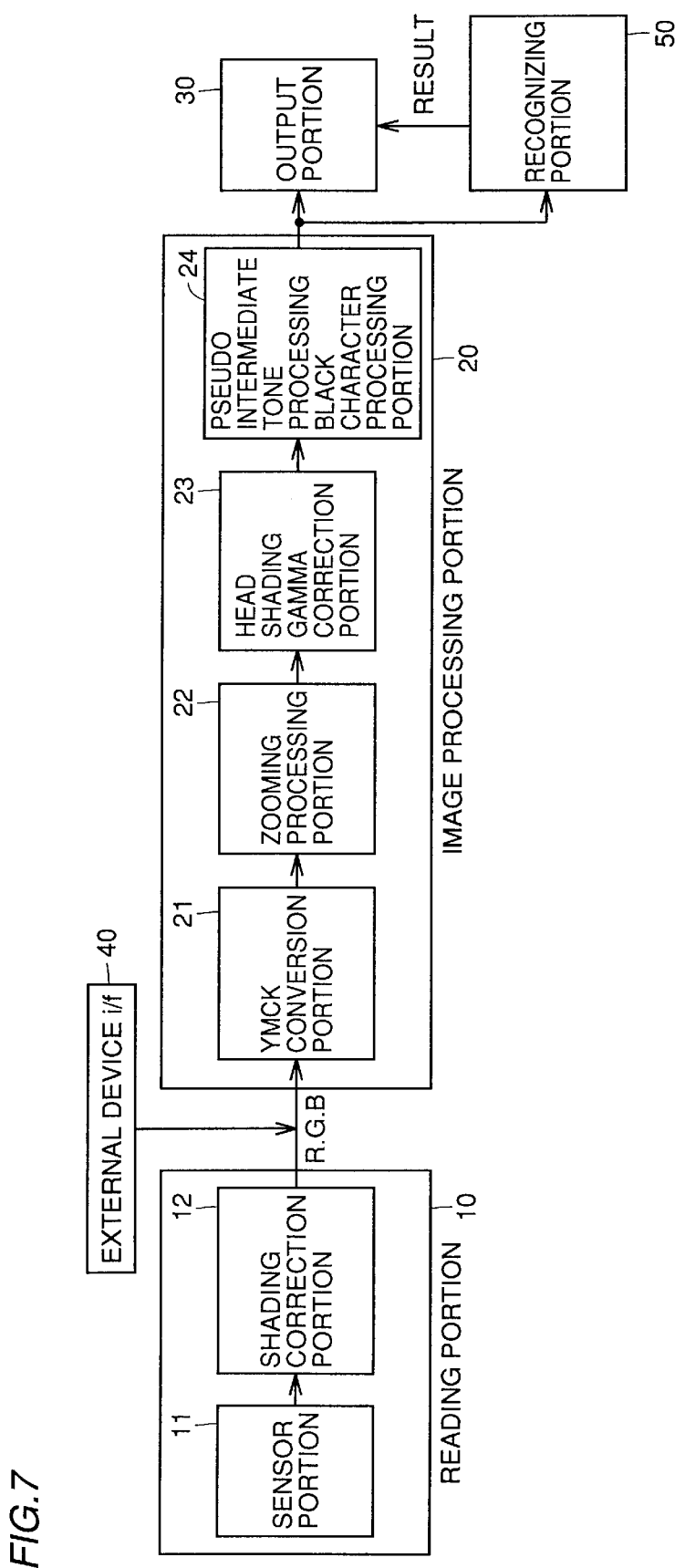
FIG. 7 is a block diagram showing a first embodiment of the present invention.

Referring to FIG. 7, a general structure of a copying machine to which the present invention is applied will be described by way of illustration.

As shown, there are provided a reading portion 10 for reading an original on the basis of a strip-shaped small region, an image processing portion 20 for obtaining RGB data output from reading portion 10 and performing prescribed image processing to the data to form an output image, and an output portion 30 for actually printing out data on a sheet based on the output of image processing portion 20.

Furthermore, the copying machine having an additional printing function includes an external device interface (i/f) 40 parallel to reading portion 10 on the input side of image processing portion 20. An RGB signal is applied to image processing portion 20 from an external computer or the like through interface 40. Note that an apparatus dedicated for copying is not provided with such external device interface 40. Conversely, a printer-dedicated apparatus may be formed by removing reading portion 10 from the configuration shown in FIG. 7.

Each portion will be further described in detail. Reading portion 10 has a sensor portion 11, and a shading correction portion 12. As described in connection with the prior art, sensor portion 11 has an image sensor (128 dots/400 dpi) such as CCD for reading a strip-shaped region, and a driving mechanism for moving the image sensor in the X-direction (sub scanning direction) and the Y-direction (page scanning direction). Shading correction portion 12 performs shading correction to image data read by sensor portion 11, in other words corrects unevenness caused by variations in the sensitivity of cells forming the sensor and the precision of optics, produces a luminance signal for leveled three colors R, G, and D, and outputs the resultant signal to image processing portion 20 in the succeeding stage.

Image processing portion 20 performs a logarithmic transformation to the RGB data applied through reading portion 10 or external device interface 40 at its YMCK transformation portion 21, produces Y (yellow), M (magenta), C (cyan) data for printing, removes the Y, M, and C color components of a black component to produce Bk (black) data. Four color component data produced by adding Bk (hereinafter simply as "K") to the YMC data is transmitted to zooming processing portion 22 and prescribed zooming processing is performed to achieve a magnification specified by the side of the copying machine main body.

More specifically, in equal size processing, the applied data is directly output. More specifically, data for 128 dots (in the main scanning direction) read by the sensor at one time is used for data (128 dots) for the printing head for one processing.

Figure 8:
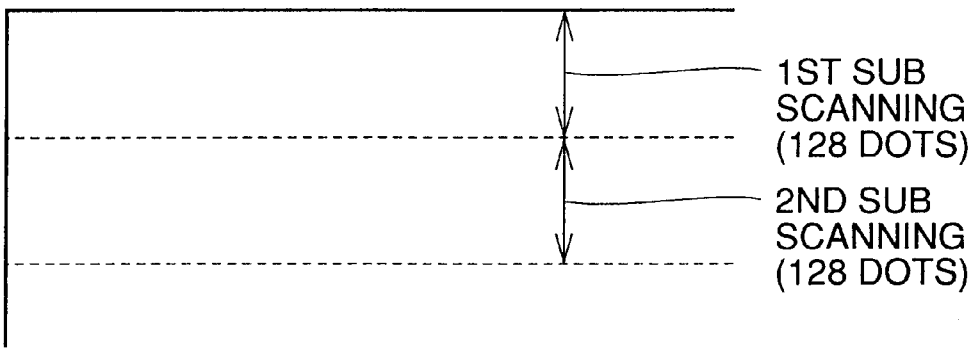
FIGS. 8 and 9 are diagrams for use in illustration of scanning in reduction processing.

In the case of reduction, among the 128 dots read by the sensor, data for a prescribed number of dots from the head is used, and data for the printing head for 64 dots (half the 128 dot data for one printing operation). For example, if the magnification is 50%, as shown in FIG. 8, 128 dots are read in the first sub scanning, and data for printing head for 64 dots is produced.

Note that data for 64 dots may be produced from the 128 dots by various methods such as simply thinning data every other time, or producing data for 1 dot by averaging data for 2 dots. Zooming processing portion 22 produces the first half 64 dot data for the printing head from the 128 dots.

Note that in actual printing, data for 128 dots is collectively processed, sensor portion 11 in reading portion 10 moves 128 dots in the page scanning direction, and the last half 64 dot data for the printing head is once again produced on the 128 dot data read by sensor portion 11 in the second sub scanning, and the first and second data are combined to produce 128 dot data for printing head for output (details of which will be described later).

Figure 9:
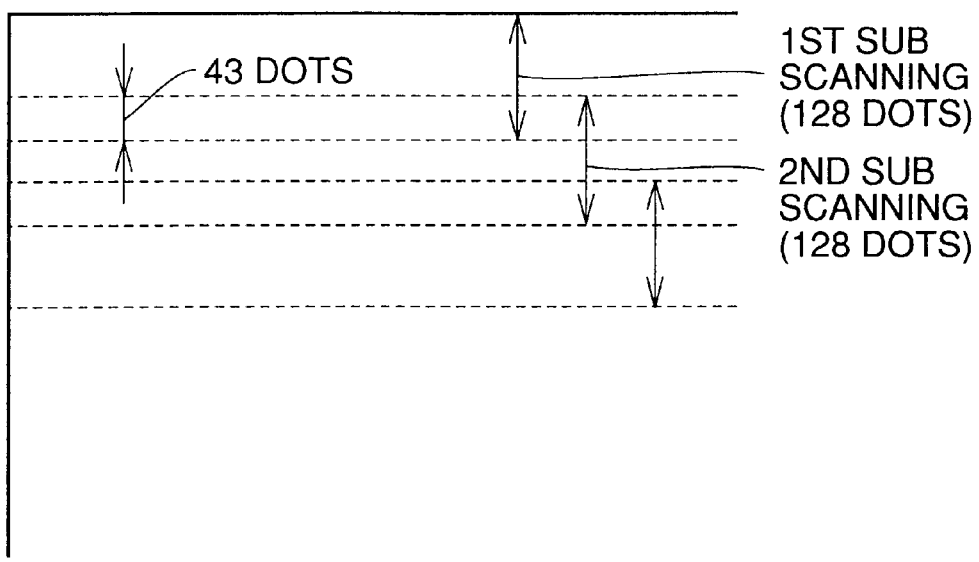

As described above, since the printing head outputs 128 dots simultaneously, if, for example, data is reduced to its 75%, as shown in FIG. 9, among data produced by reading 128 dots in the first sub scanning, data for 85 dots from the head is used to produce data for 64 dots for the printing head. Thus, data is reduced from the 85 dots to 64 dots, and data of a reduction ratio of about 75% with respect to the read image data is produced. Zooming processing portion 22 extracts data corresponding to the first to N-th data to produce data for 64 dots.

Note that, since N-dot data (85 dot data for 75%) is used, data beyond N+1-th dot and on (85 dots for 75%) is not used. Therefore, image data corresponding to such a portion is produced based on data obtained in the next sub scanning. As a result, the moving distance of the sensor in the page scanning direction at sensor portion 11 is for N dots used in the first sub scanning, and data for 128 dots is read from the N+1-th dot in the second sub scanning (data actually used is data from the head to N-th dot). Thus, the moving distance in the page scanning differs depending upon the reduction ratio.

Although not shown, in the case of expansion, among 128 dot pixel data obtained in the first sub scanning, data from the head to N-th dot is subjected to an appropriate interpolation process to produce data for 128 dots for the printing head. More specifically, if the image is expanded at 200%, data for 64 dots from the head is formed into 128 dots to achieve the expansion ratio of 200%. The process is performed by zooming processing portion 22. During the expansion processing, data for N dots from the head is used, the moving distance of the page scanning also corresponds to N dots.

The number of dots used from the head among read 128 dots in the above reduction/expansion processing, the moving distance in the page scanning, and the number of dots for data for the printing head produced based on the extracted dot data are as shown in FIG. 10. The example shown is simply by way of illustration, and the manner of reduction/expansion processing is not limited to the above.

The output of zooming processing portion 22 is transmitted to a head shading/gamma correction portion 23, and a pixel signal is corrected (head shading correction) for each nozzle, in order to eliminate unevenness (shading) at the time of printing based on variations in the shape of nozzles at the printing head. Furthermore, in order to express more clearly inter-character gaps or the like, a gamma correction wherein edges are stressed, or general brightness in the result of printing is adjusted by adjusting the increase/decrease in the concentration signal is performed.

Data after these corrections is applied to a pseudo intermediate tone processing/black character processing portion 24 in the succeeding stage, and whether or not to output ink from a corresponding nozzles is determined. More specifically, there are 128 sets of 4 nozzles for each color component at the printing head. For each of 128 dot pixels, among the four nozzles, the determination is binary as to whether or not to output corresponding ink from a prescribed nozzle(s). Then, pseudo tone expression is performed by means of error diffusion or density averaging, and each pixel is binarized by referring to the density of surrounding pixels (pseudo tone processing).

Furthermore, for the portion of black characters, a signal which turns on only Bk (black signal) to allow only the ink to be ejected from a nozzle corresponding to the black signal, while prohibits ink from being ejected from nozzles for other color signals. Thus, in color printing, the part of black characters can be more clearly printed.

Figure 11:
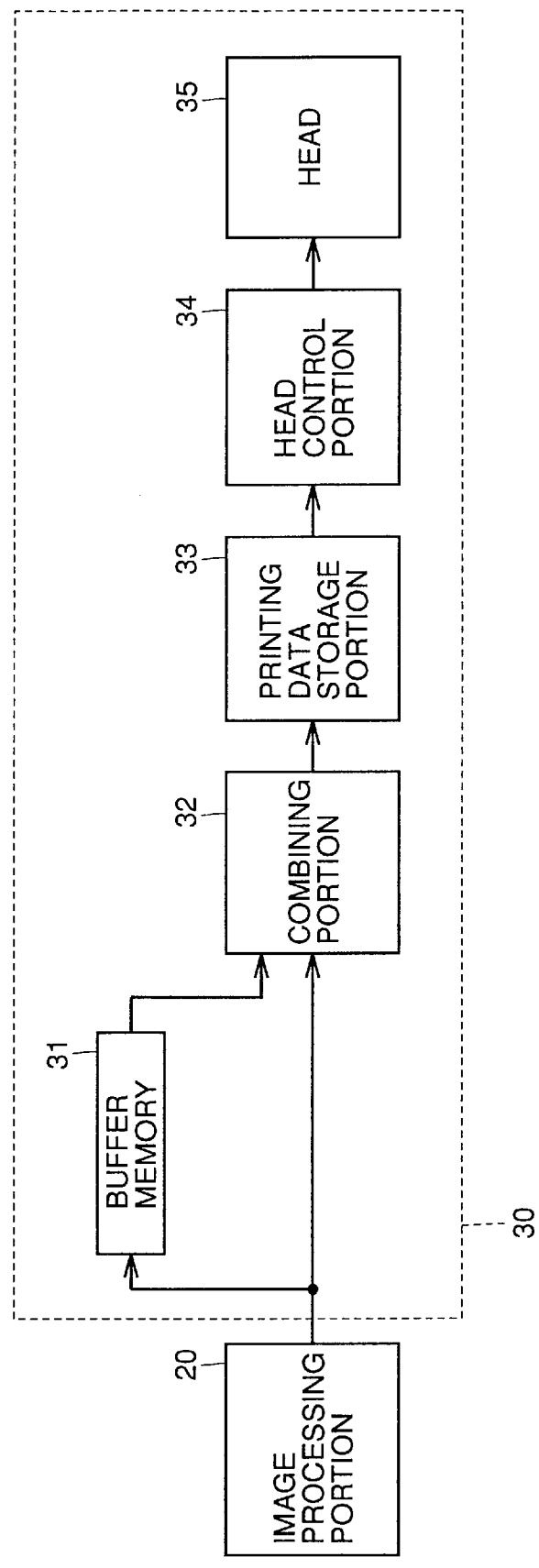
FIG. 11 is a diagram showing the configuration of the inside of an output portion.

Output portion 30 has a buffer memory 31 and a combining portion 32 on the input side as shown in FIG. 11, and data output from image processing portion 20 is applied to any of these portions. More specifically, data on the basis of 128 dots (in equal size and expansion processing) or 64 dots (in reduction processing) is applied from image processing portion 20 as described above. Then, data finally printed is on the basis of 128 dots.

If data for the first half 64 dots is input in reduction processing, the data is stored in buffer memory 31. When data for the last half 64 dots is input, the last half data is applied to combining portion 32, and the data stored in buffer memory 31 is also applied to combining portion 32, where data for 128 dots is produced. The thus produced data is stored in a printing data storage portion 33.

In equal size processing and expansion processing, data for 128 dots is transmitted from image processing portion 20, and the data is directly stored in printing data storage portion 33 through combining portion 32. Whether 128 dot data or 64 dot data is transmitted is determined based on a control signal (1/0 flag) applied from image processing portion 20.

In printing data storage portion 33, a control signal is transmitted in a prescribed timing to a head control portion 34, which controls printing head 35 including a prescribed number of nozzles and ink tanks or the like to operate based on the control signal, so that ink in a prescribed color is ejected to a prescribed pixel of the 128 dots for printing processing.

Note that image processing portion 20 and output portion 30 as described above is known devices, and therefore detailed description of each of these devices is not provided. If necessary, a detailed description is given in for example *NIKKEI ELECTRONICS*, May 25, 1992, pp. 195–214 (excluding the zooming operation portion).

Herein, according to the present invention, a recognizing apparatus 50 for detecting a particular pattern is provided as shown in FIG. 7. The output of image processing portion 20 as described above is applied to recognizing apparatus 50, where a prescribed recognizing process is performed to image data for printing after zooming processing, and a result of recognition (a detection signal of the particular pattern) is applied to output portion 30 to perform prescribed outputting prohibiting processing. More specifically, according to the present invention, image data or data similar to the image data (after zooming processing) formed for printing is used for the recognizing process.

Therefore, image data applied for image processing may be equally treated regardless of if the data is applied from reading portion 10 or from external device interface 40. As a result, the apparatus having the same structure may be applied as a recognizing portion for a copying machine as well as a recognizing portion for a printer.

Figures 12, 13:
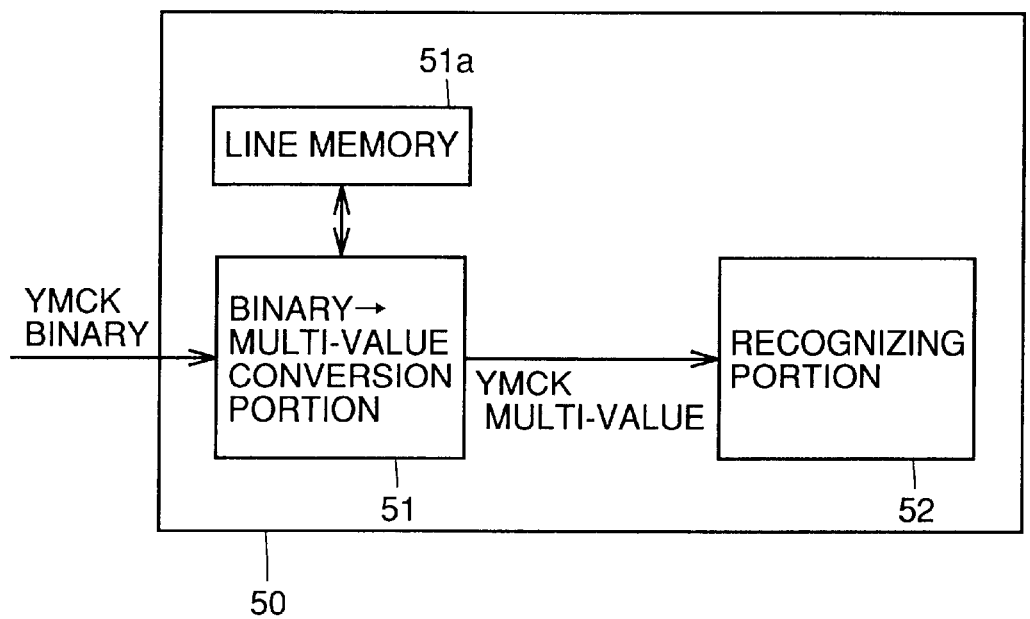
FIG. 12 is a diagram showing the configuration of the inside of a recognizing apparatus.
FIGS. 13 and 14 are diagrams for use in illustration of the function of a binary/multi-value conversion portion.
Figure 14:
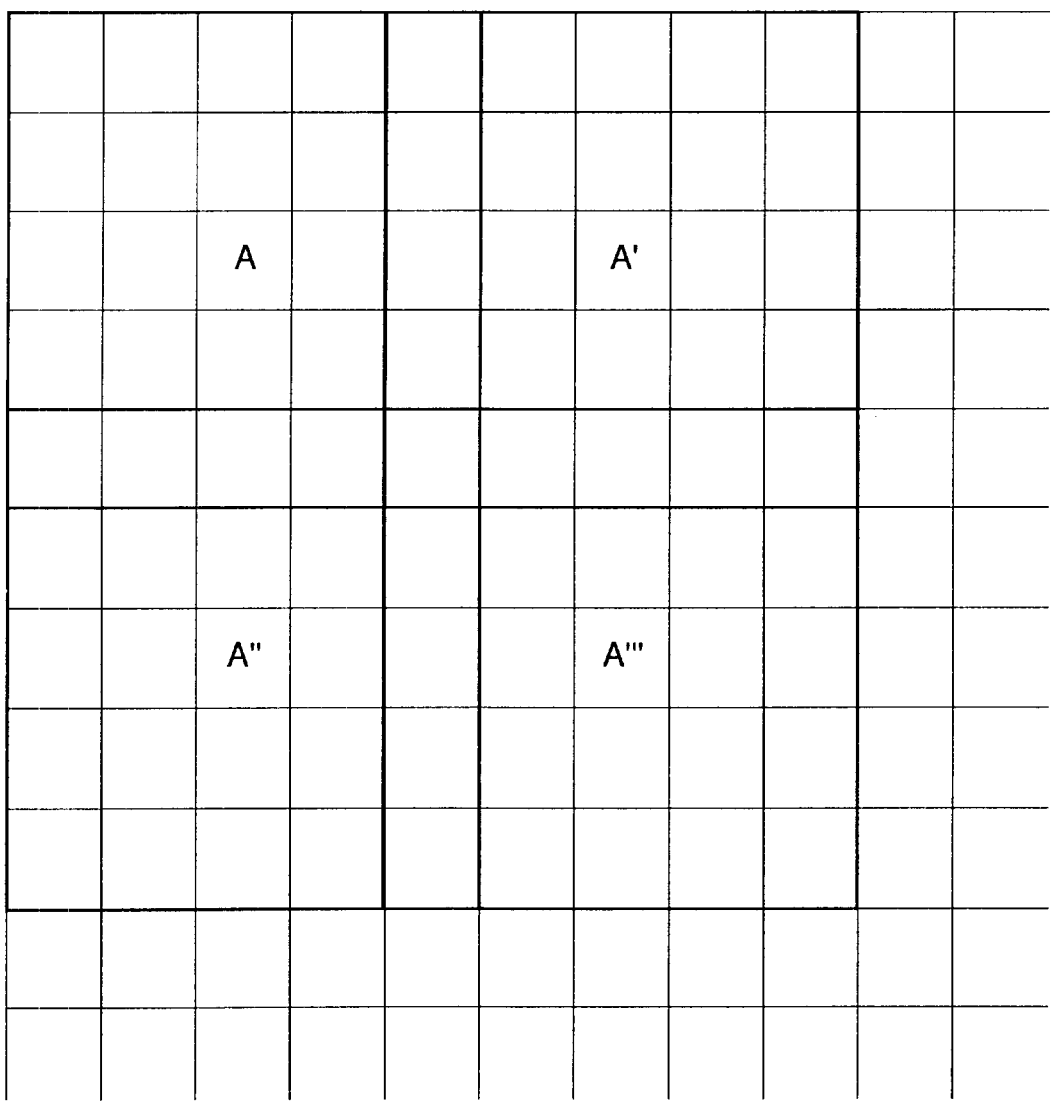

The configuration of the inside of recognizing apparatus 50 is as shown in FIG. 12. More specifically, data output from image processing portion 20 is binary data in YMCK, and therefore a binary/multi-value conversion portion 51 is provided on the input side in this embodiment, where data is converted into multi-value data having tones, and the amount of information is increased, so that highly precise recognition is permitted. Multi-value data in YMCK is applied to recognizing portion 52, and an actual recognizing process is performed.

Binary/multi-value conversion portion 51 uses a 5×5 filter as shown in FIG. 13, for example, and weights the values of the surrounding binary data (1/0) with respect to pixel A in the center to be processed, and produces multi-value data by thus summing the data. Note that a to f in FIG. 13 are coefficients, and a=11, b=6, c=3, d=2, e=1, and f=0 as shown are examples. Then, if all the pixels in a 5×5 matrix are all 1, multi-value data, 63 is available. However, since color image data is normally expressed in 256 tones or more, the amount of information is small as compared to such normal color image data.

If pixels to be processed used as a reference for producing multi-value data are set for each 4 pixels such as A, A', A" . . . , a 400 dpi image may be formed into a 100 dpi multi-value image. Naturally, if such process is performed to all the pixels, multi-value data may be produced while maintaining the original resolution, and the manner of the process is determined taking into consideration the processing speed, precision and the like.

Furthermore, a line memory 51a is provided for using the data of surrounding pixels as described above, necessary pixel data is temporarily held at line memory 51a, and multi-value processing is performed while reading out necessary pixel data. Note that, since data is applied on a 1-line basis in the lengthwise direction, data in the lengthwise direction is also stored on a one-line basis in line memory 51a, and once five lines of such data are stored in the sub scanning direction, the stored data is read out for multi-value processing.

Figure 15:
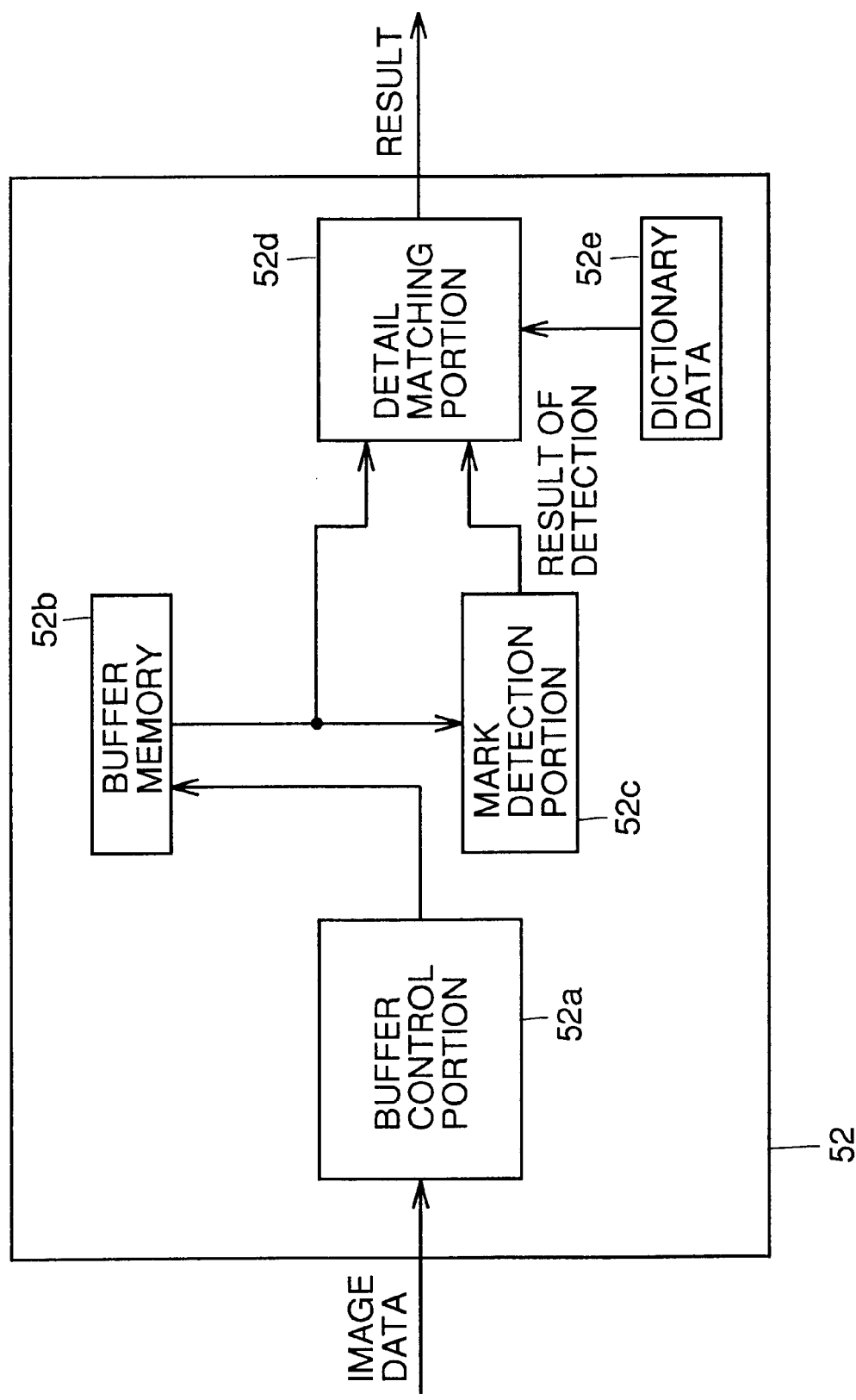
FIG. 15 is a block diagram showing the configuration of the inside of a recognizing portion.

Meanwhile, recognizing portion 52 is as shown in FIG. 15. More specifically, binary/multi-value conversion portion 51 sequentially applies the image data to buffer control portion 52a, which addresses the applied image data and stores data at a prescribed address in buffer memory 52b.

More specifically, if pixels forming image data for printing are arranged as shown in FIG. 16, and their coordinates are given as (xi, yj), data is applied from image processing apparatus 20 on a one-line basis in the lengthwise direction, the main scanning direction in the figure. Once multi-value processing has been performed to all the pixels at binary/multi-value conversion portion 51, if 126 dots are input from image processing apparatus 20 each time, multi-value data of the same pixel number is output from binary/multi-value conversion portion 51 (data is different, because it is converted into multi-data), data at (0, 0), (0, 1), . . . , (0, 127) is applied for the first time, and data at (1, 0), (1, 1), . . . , (1, 127) is applied for the second time. When data up to the end of the sub scanning direction (i=max) is applied, which means data for 126 dots ahead in the page scanning direction will have been applied, in other words data for (0,128), (0,129), . . . , (0,255) will have been applied (thereafter sequentially applied).

If 64 dot data is applied each time as in a reduction process, data at (0,0), (0,1), (0,63) is applied for the first time, and data at (1,0), (1,1), . . . , (1,63) is applied for the second time. When data up to the end of the sub scanning direction (i=max) is applied, which means data for 64 dots ahead in the page scanning direction will have been applied, in other words data for (0,64), (0,65), . . . , (0,127) will have been applied (thereafter sequentially applied).

Use of the coordinate values for the addresses in buffer memory 52b, image data applied in the lengthwise direction may be stored in the crosswise direction (see FIG. 17). More specifically, X-coordinate values (xi) are used for lower addresses in the memory, while Y-coordinate values (yj) are used for higher addresses in the memory. Thus, if data raster-scanned in a strip-shaped manner (main scanning+sub scanning) is page-scanned data, data sequentially transmitted in one line in the lengthwise direction is stored in an arrangement of one line in the crosswise direction, and stored at addresses corresponding to the positions of the pixels of image data to be printed.

Note that, if the resolution is lowered at binary/multi-value conversion portion 51, the number of pieces of data applied at a time to recognizing portion 52 is different, but data is similarly applied on the basis of one line in the lengthwise direction, and addressing is performed to the buffer memory based on coordinate values.

Data stored in buffer memory 52b is sequentially applied to mark detection portion 52c and a detail matching portion 52d, where a prescribed mark is detected by mark detection portion 52c, and if an image appearing corresponding to the prescribed mark is detected, a detection signal is sent to detail matching portion 52d, where a detail matching process is performed to make accurate determination.

Figure 18A:
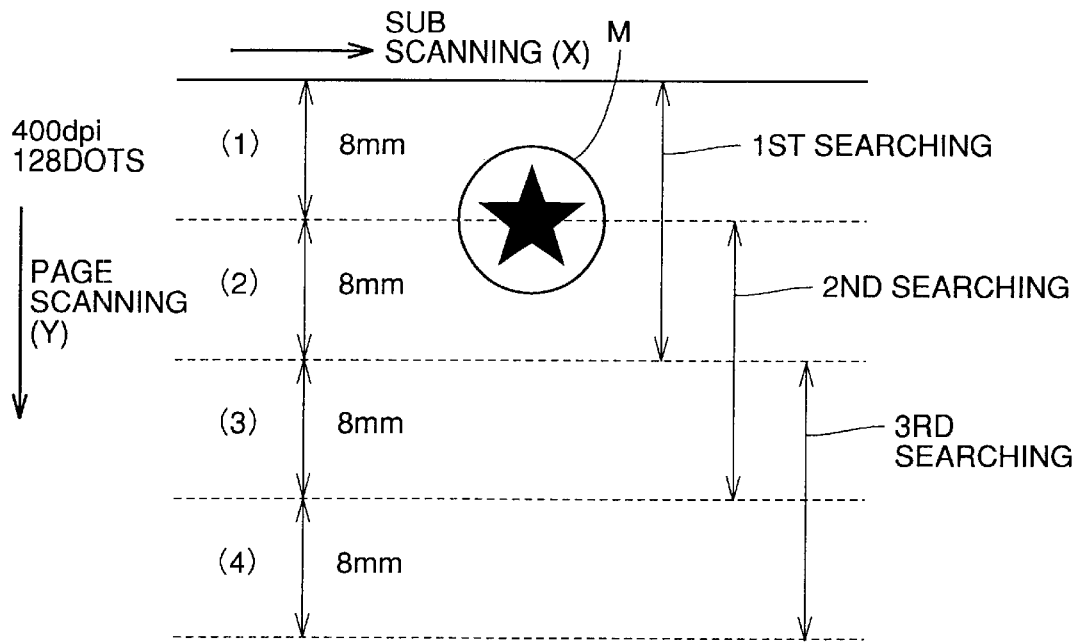
FIGS. 18A and 18B are diagrams for use in illustration of the function of a mark detection portion.
Figure 18B:
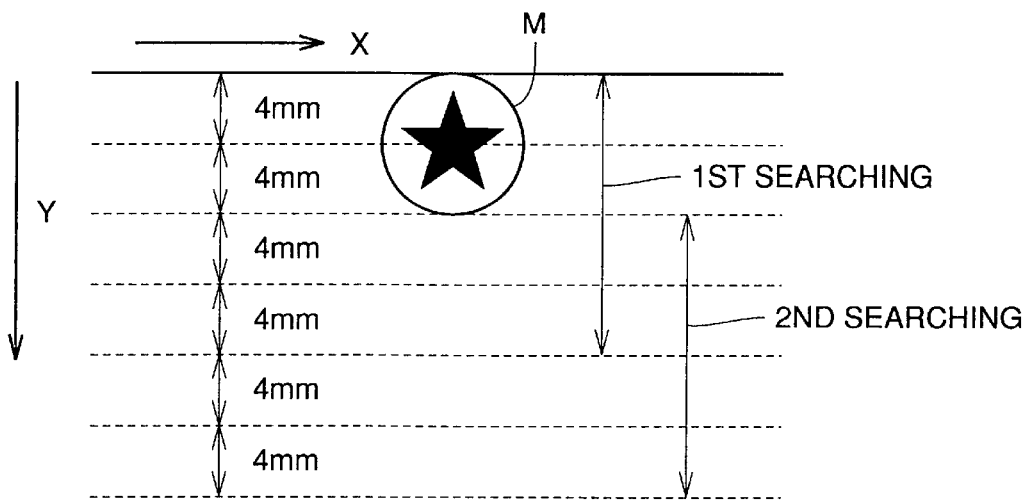

The processing function of mark detection portion 52c will be now described. Let us assume that a particular mark M formed of "a combination of a circle and a star" as shown in FIGS. 18A and 18B has been printed in a particular original (image data) to be detected, and such particular mark M will be detected. If the size of particular mark M is 8 mm, the width of output data produced based on one sub scanning by equal size or expansion processing is 128 dots at 400 dpi, which matches the size of 8 mm. However, the particular mark is not necessarily present in the sub-scanned strip-shaped region, and such mark is usually present bridging adjacent regions (see FIG. 18A). Mark detection portion 52c starts searching the moment data for 16 mm width obtained by the second sub scanning is stored in buffer memory 52b.

More specifically, image data produced based on the first sub scanning is only stored in the buffer memory, and mark detection portion 52c does not yet operate at that point. When image data produced based on the second sub scanning is stored in the buffer memory, searchable data is collected. After data based on the second sub scanning is stored, data stored for the first time and second time is read out for first searching. After image data produced based on the third sub scanning is stored in the buffer memory, data stored for the second time and the third time is read out for the second searching. Thereafter, repeating the above-described process, the presence/absence of particular mark M is determined for each 16-mm width strip-shaped region. Note that various known recognizing algorithms may be applied such as determination by pattern matching or characteristics amount extraction for the specific process of detecting particular mark M, and therefore a detailed description thereof is not be provided.

Figure 19:
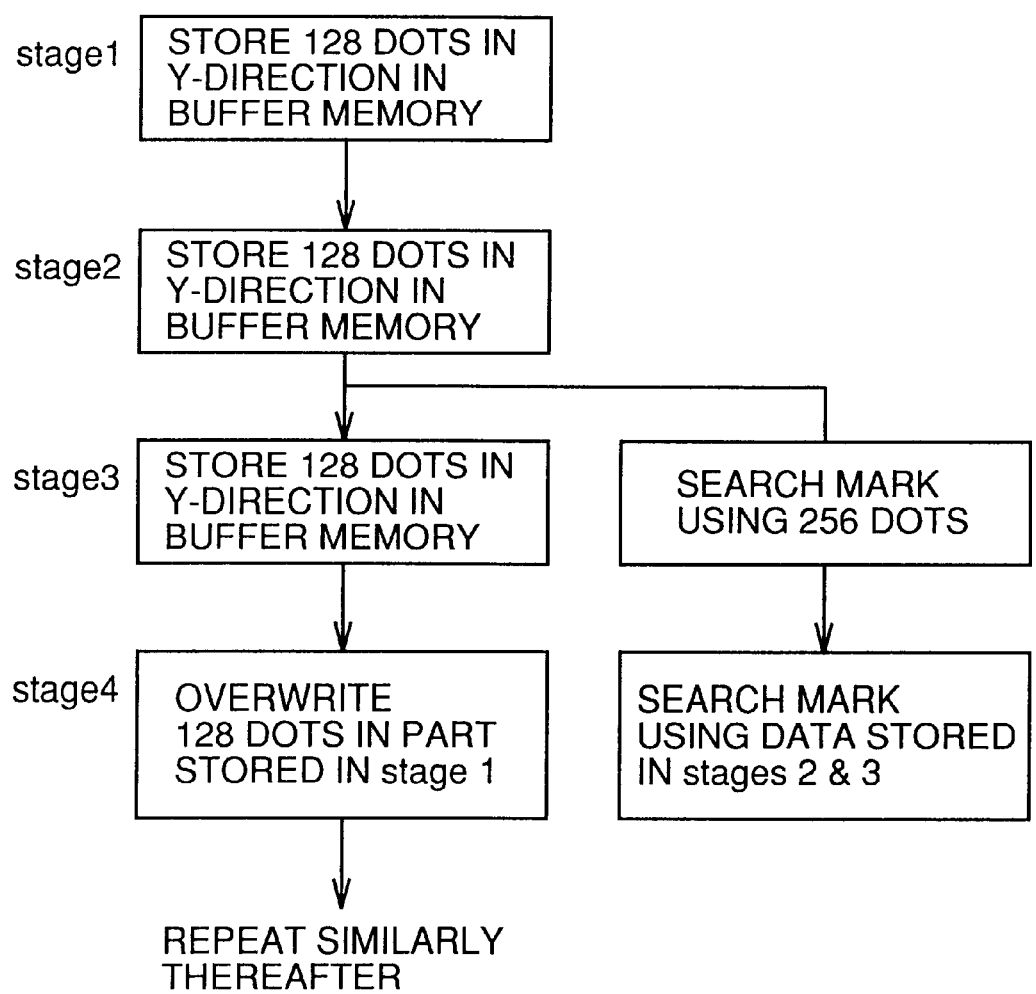
FIGS. 19, 20 and 21 are diagrams for use in illustration of the function of a mark detection portion and a buffer control portion.

The operation timings of writing/reading to buffer memory 52b and searching processing at mark detection portion 52c are as shown in FIG. 19. More specifically, image data for 128 dots in the Y-direction (main scanning direction) is stored in stage 1. In stage 2, a page scanning is performed to store image data for 128 dots in the Y-direction (main scanning direction) for the next strip-shaped region in buffer memory 52b. At the time, the data is stored in a region different from the region that has stored the data in stage 1.

Then, in stage 3, a page scanning is performed to store image data for 128 dots in the Y-direction (main scanning direction) for the next strip-shaped region in buffer memory 52b. At the time, the data is stored in a region different from the regions that have stored the data in stages 1 and 2. Since searchable data has been collected by the process in stage 2, particular mark M is searched using the already stored data for 256 dots in parallel with storing data in stage 3.

Similarly, in stage 4, a page scanning is performed to store image data for 128 dots in the Y-direction (main scanning direction) for the next strip-shaped region in buffer memory 52b. At the time, since the data stored in stage 1 has already been used in the searching process in stage 3, the data is overwritten at the portion stored in stage 1. Further in stage 4, particular mark M is searched using the data for 256 dots stored in stages 2 and 3.

Thereafter, the above-described process is repeated for data storage and searching processing. If anything like particular mark M is detected, a detection signal is output to detail matching portion 52d. Note that the memory normally operates on the basis of multiples of 4, the data may be stored in a separate location in stage 4, and in stage 5, the data may be overwritten in the part of the memory which stored data in stage 1 to form a ring buffer.

Meanwhile, as described above, in the case of reduction processing, the image data for 64 dots for printing is produced in the first sub scanning. As a result, data for only 4-mm width is applied. As shown in FIG. 18B, data in a strip-shaped region of 16-mm width the same as the above is collected by four sub scanning operations. Therefore if data for the four sub scanning operations has been stored, the data is read out for searching processing. In this embodiment, in order to make the timing of searching processing and the region to search the same as those in the equal size, expansion processing shown in FIG. 18A, data for the past four sub scanning operations is read out every time data for 8 mm width (two sub scanning operations) is collected thereafter, based on which searching processing is performed.

Figure 20:
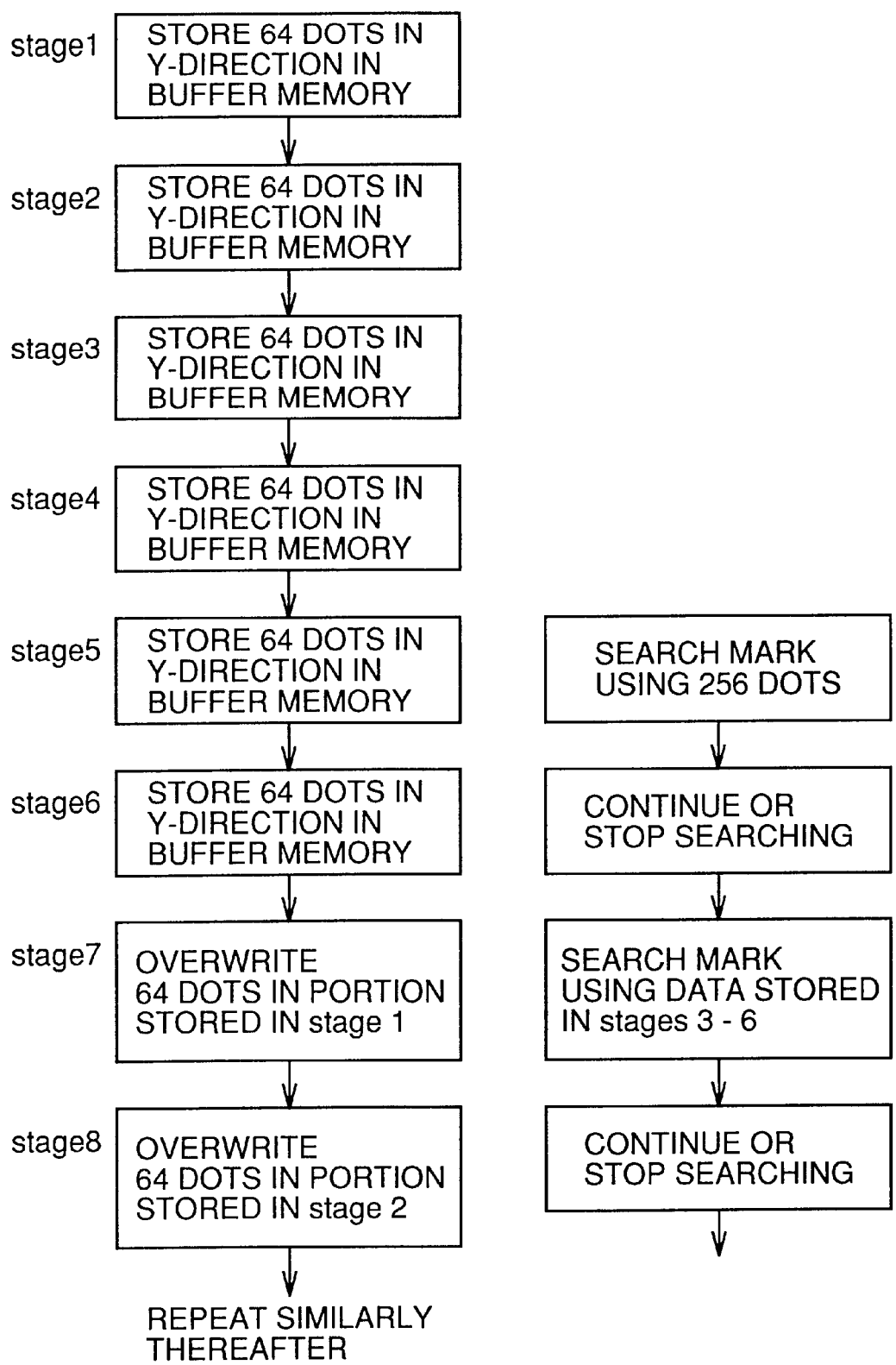

The specific process flow corresponding to such process is as shown in FIG. 20. More specifically, image data for 64 dots in the Y-direction (main scanning direction) is sequentially stored in separate portions in buffer memory 52b in stages 1 to 4. In stage 5, a page scanning is performed to store image data for 64 dots in the Y-direction (main scanning direction) for the next strip-shaped region in a separate portion. Since searchable data has been collected by the process up to stage 4, the already stored data for 256 dots (data obtained by operations in stages 1 to 4) is used to search particular mark M in parallel to storing data in stage 5.

Then, in stage 6, a page scanning is performed to store image data for 64 dots in the Y-direction (main scanning direction) for the next strip-shaped region in buffer memory 52b at a different portion. At the time, on the side of mark detection portion 52c, the searching processing which has been performed in stage 5 based on the data obtained by performing operations in stages 1 to 4 continues, or the searching processing has been interrupted. More specifically, in the case of reduction processing, the moving time for sub scanning is shortened, and the time required for searching based on once sub scanning processing is shortened as well. Since searching processing to a region for 256 dots may not be completed, and spare time for searching is secured in stage 6, so that the searching processing can be surely completed.

Furthermore, in stage 7, a page scanning is performed to store image data for 64 dots in the Y-direction (main scanning direction) for the next strip-shaped region in buffer memory 52b. At the time, since the data stored in stages 1 and 2 has been used by the searching processing in stages 5 and 6, the portion stored in stage 1 is overwritten. In stage 7, particular mark M is searched, using the data for 256 dots stored in stages 3 to 6.

Thereafter, data storage and searching processing are performed by repeating the above process. If anything like particular mark M is detected, a detection signal is output to detail matching portion 52d.

Note that if the searching processing may be completed in a single stage, the searching processing is performed based on data for previous three searching operations, once data for the three searching operations is obtained, rather than starting searching processing after obtaining data for four searching processings, and thereafter searching processing may be performed each time data based on the first sub scanning is obtained.

Figure 21:
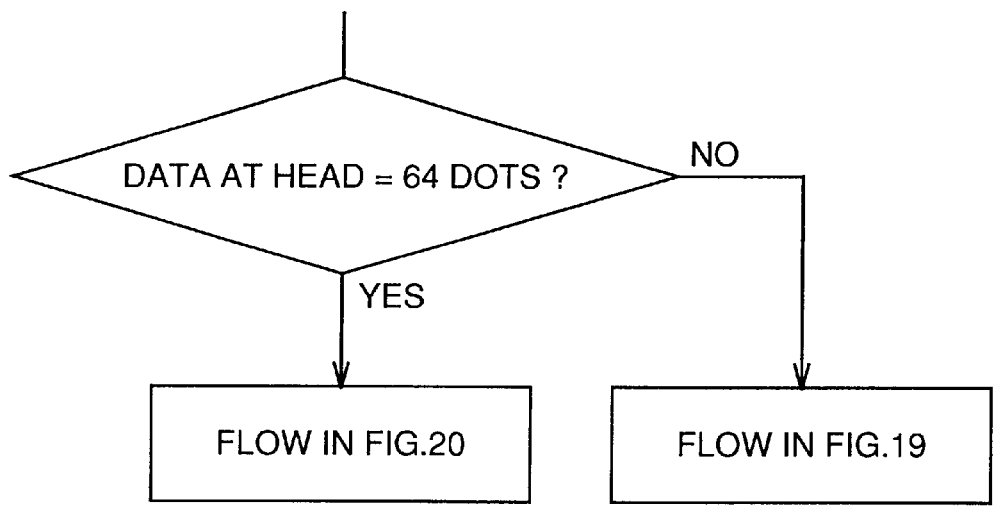

In practice, as shown in FIG. 21, it is determined whether data for printing head is 64-dot data, the flow shown in FIG. 20 is executed if the data is 64-dot data, and the flow in FIG. 19 is executed if the data is not 64-dot data (if it is 128-dot data). If the data is 64-dot data or not is determined based on the flag applied from image processing portion 20. More specifically, at the time of printing processing at output portion 30, whether or not to combine images is switched based on the flag signal from image processing portion 20, and therefore such a flag is also applied to the side of recognizing apparatus 50.

In the above-described example, since multi-value data is produced without lowering the resolution at binary/multi-value conversion portion 51, searching processing is performed each time data for 256 dots is secured, but if the resolution is degraded to a level such as 100 dpi, the processing will be performed based on image data based on sub scanning data for two operations (equal size or expansion processing) or four operations (reduction processing) which corresponds to data of 16 mm width. Thus, the number of dots is not limited to the above and may be reduced.

Meanwhile, detail matching portion 52d is used to surely determine whether or not image data is a copy/printing prohibited item if a particular mark is detected by mark detection portion 52c, and performs prescribed recognizing processing based on dictionary data 52e stored in a ROM or the like.

More specifically, since the position of the particular mark is available by the function of mark detection portion 52d, the portion is cut out by the detailed matching portion, subjected to rotational matching with the dictionary data stored in the ROM for high precision determining. For specific recognizing algorithms, various known algorithms may be applied, and therefore a detailed description thereof is not provided.

In order to detect a pattern in a prescribed positional relation from a reference using particular mark M detected by mark detection portion 52c as the reference for an object to be recognized by detail matching portion 52d, an object to be detected at mark detection portion 52c may be naturally different from an object to be detected at detail matching portion 52d. Then, the above particular mark M detected at mark detection portion 52c, a particular mark detected by the detail matching portion or the pattern in the prescribed positional relation is a particular pattern to be recognized (detected) according to the present invention.

One embodiment of a method of recognizing using the above-described apparatus according to the present invention will be described. When the apparatus is used as a copying machine, the sensor is moved in the sub scanning direction at reading portion 10 to obtain data in the sub scanning at each position, and one strip-shaped region is raster-scanned to obtain image data (RGB). RGB data obtained after prescribed shading correction is subjected to sub scanning processing as it is sequentially applied to image processing portion 20 in real time. If zooming processing is performed, complicated operations are involved such as changing the speed of moving in the sub scanning direction or changing the moving distance in the page scanning direction depending upon the magnification (expansion/reduction ratio).

Image processing portion 20 converts the applied image data into YMCK data, and then produces 128 dot-image data depending upon the magnification if equal size and expansion processing is performed by zooming processing portion 22. In a reduction processing, 64 dot-image data is produced depending upon the magnification. More specifically, at reading portion 10, various kinds of complicated operations are performed depending upon the magnification, while the output of zooming processing portion 22 is limited to two kinds, 128 dots and 64 dots.

Then, prescribed correction processing and pseudo tone processing are performed, and binary data for YMCK is produced and applied to output portion 30. At the time, data is applied on the basis of 128 dots or 64 dots corresponding to the output of zooming processing portion 22. The YMCK binary data is also applied to recognizing apparatus 50 in parallel to the above operation.

Then, at output portion 30, image data for printing head is produced based on the applied image data, and printing is performed to a strip-shaped region on the basis of data for 128 dots at the printing head. Recognizing apparatus 50 converts YMCK (binary) data into multi-value data at binary/multi-value conversion portion 51, and then applies the result to recognizing portion 52 for prescribed recognizing processing. Once a particular mark (pattern) is detected, a detection signal is applied to output portion 30, based on which output portion 30 stops printing.

As described above, in this embodiment, since data for printing after zooming processing or similar data is used for determination, such data may be classified into two kinds regardless of the magnification, and therefore accurate determination may be made by simple algorithms.

When the apparatus is used as a printer, RGB data is applied to image processing portion 20 in a prescribed order from an external device such as computer through external device interface 40. Data for a prescribed number of dots in the main scanning direction is sequentially applied along the sub scanning direction as is the case with the output from reading portion 10. In such processing, data is sequentially transmitted from a position separated by a prescribed bit number in the page scanning direction. Note that the processing at and after image processing portion 20 is the same as the process by the above-described copying machine, a description of which is not provided.

Note that in the above-described embodiment, recognizing portion 52 performs processing based on YMCK multi-value data, but the invention is not limited to this, and YMCK binary data may be directly applied to recognizing portion 52, which may perform recognizing processing based on the binary data, without providing binary/multi-value conversion portion 51 shown in FIG. 12.

Figure 22:
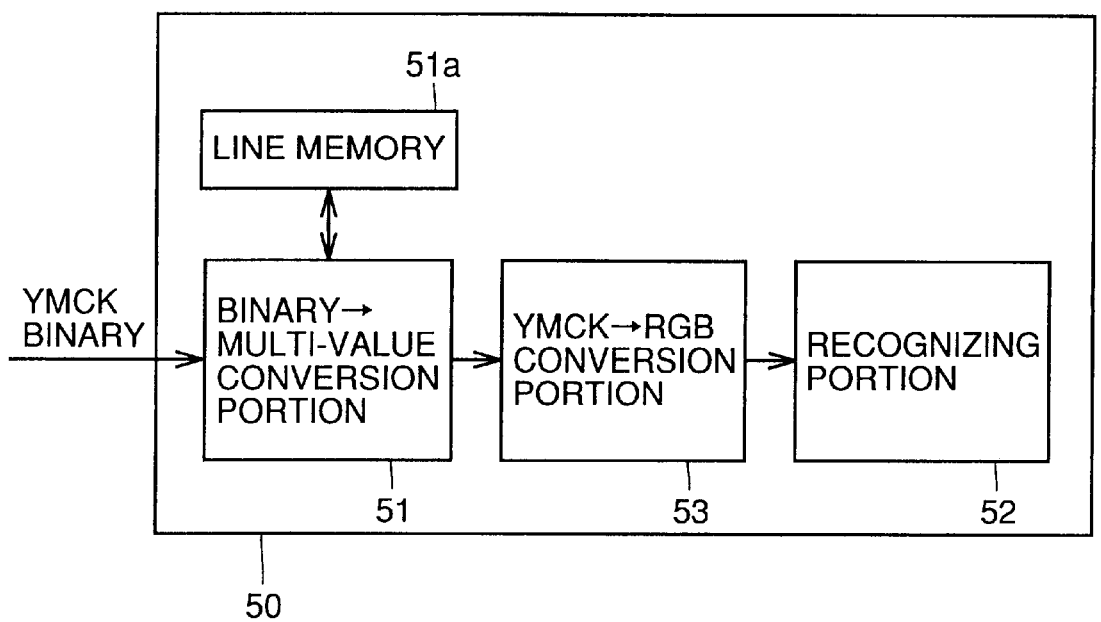
FIG. 22 is a diagram showing another example of a recognizing apparatus.

As shown in FIG. 22, a YMCK/RGB conversion portion 53 may be provided between binary/multi-value conversion portion 51 and recognizing portion 52, to convert YMCK data (multi-value) to RGB data (multi-value), and recognizing processing may be performed based on the RGB data. At YMCK/RGB conversion portion 53, a lookup table is for example used to convert YMCK to RGB. Processing in recognizing portion 52 is basically same as that described in connection with the above-described embodiment except that data to be treated is changed from YMCK to RGB.

Figure 23:
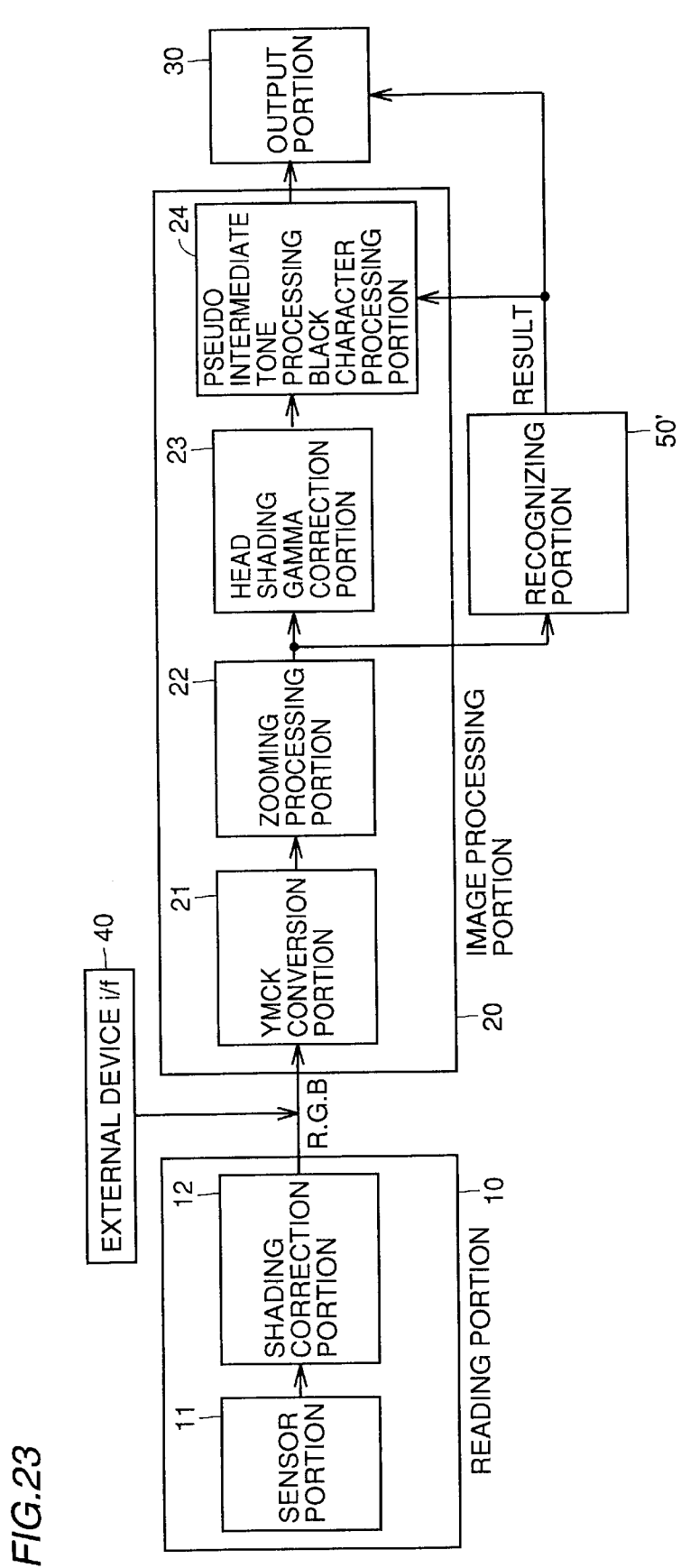
FIG. 23 is a block diagram showing a second embodiment of the invention.

FIG. 23 shows a second embodiment of the invention. As shown, in the second embodiment, the position of connecting recognizing portion 50' is different from the first embodiment. More specifically, the output of zooming processing portion 22 (YMCK multi-value data) is applied to recognizing apparatus 50'.

In recognizing apparatus 50', since image data is multi-value information, only recognizing portion 52 may be provided by removing binary/multi-value conversion portion 51 from recognizing apparatus 50 shown in FIG. 12 according to the first embodiment, or YMCK/RGB conversion portion 53 and recognizing portion 52 may be provided by removing binary/multi-value conversion portion 51 from recognizing apparatus 50 shown in FIG. 22.

Since the multi-value data normally has at least 256 tones, the buffer memory must have a larger capacity, and shorter accessing time is requested for reading/writing from/to the memory, which is to increase in the cost.

Figure 24:
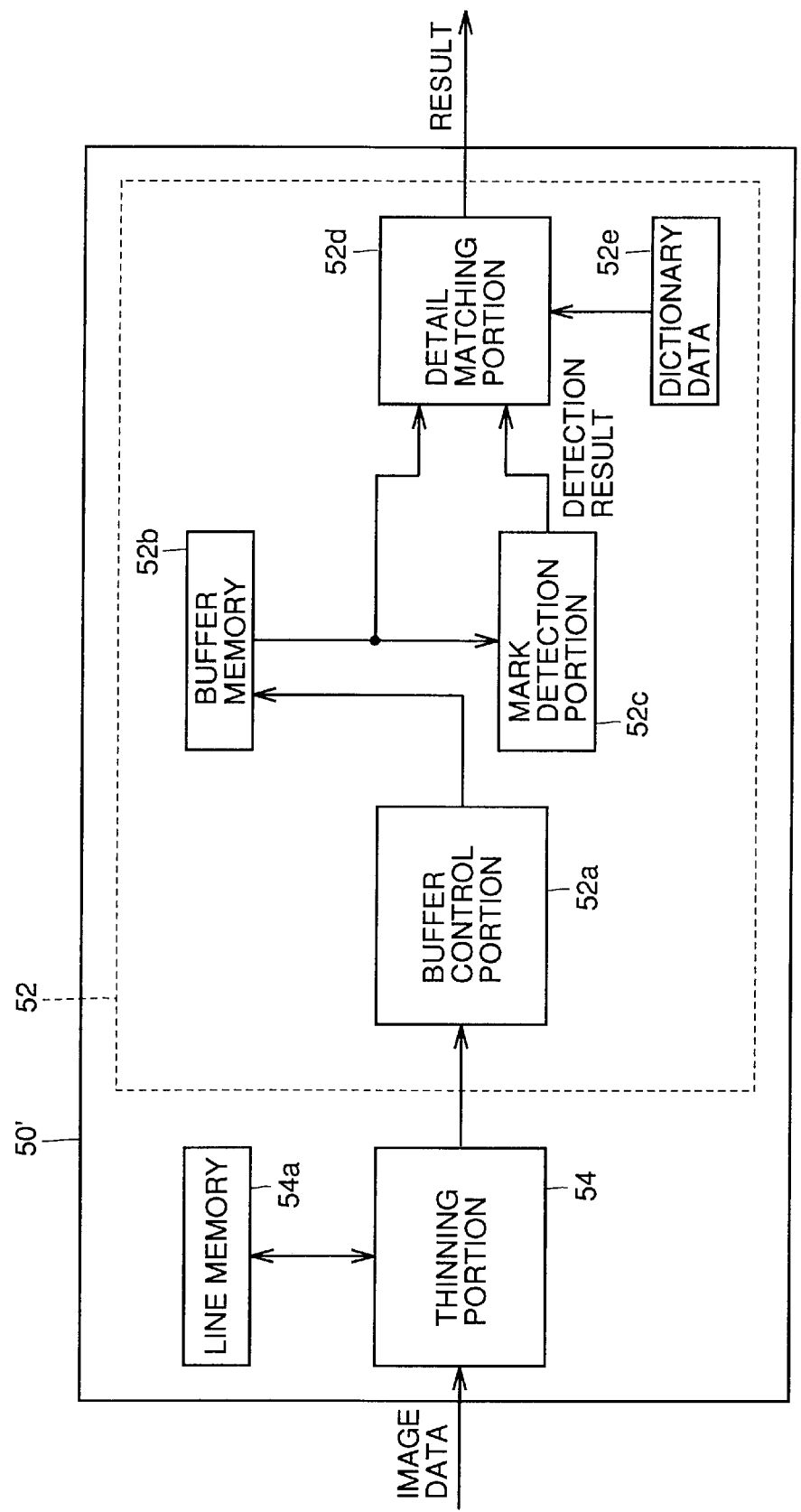
FIG. 24 is a diagram showing an example of a recognizing apparatus according to the second embodiment of the invention.

Thus, as shown in FIG. 24, for example, a thinning portion 54 may be provided before recognizing portion 52 in order to reduce the resolution. Thinning portion 54 may reduce the resolution from 400 dpi to 100 dpi by averaging processing as shown in FIGS. 25A and 25B. More specifically, the sum of the density values of pixels (1) to (16) present in a 4×4 region is produced, the produced value is divided by the number of pixels to produce an average value, and the value 16 times as many as the average value is used as the density value of one pixel after thinning (see FIG. 25B).

Since data for a prescribed number of pixels should be held for the averaging process, data applied to line memory 54a is held, and once data for a prescribed number of lines (four lines in this embodiment) is stored, the data is read out for thinning (averaging) processing.

Since the main scanning direction is in the lengthwise direction in the figure, data is sequentially applied on the basis of one line in the lengthwise direction. More specifically, image data for (1), (5), (9), (13), . . . is applied for the first time, and image data for (2), (6), (10), (14), . . . is applied for the second time. The applied image data is sequentially stored in line memory 54a. Then, data is applied sequentially in the sub scanning direction, and once data up to the fourth line in the sub scanning direction has been applied, data for the previous three lines is also read out from line memory 54a, and the averaging processing is formed using the data.

Note that the structure and function of recognizing portion 52 is the same as those described in connection with the first embodiment, except that data to be processed is multi-value data having its resolution degraded after thinning processing, the same portions are denoted by the same reference characters, and a detailed description thereof is not provided.

Recognizing apparatus 50' performs prescribed recognizing processing, and if a copy/output prohibited item is recognized, the detection signal is applied to pseudo intermediate tone processing/black character processing portion 24 or output portion 30 for copy prohibiting processing. More specifically, to output portion 30, the processing the same as described in connection with the first embodiment may be performed. Pseudo intermediate tone processing/black character processing portion 24 stops output of YMCK binary data, or sets all the pixels as "black=1, other colors= 0" to entirely blot out in black.

Figure 26:
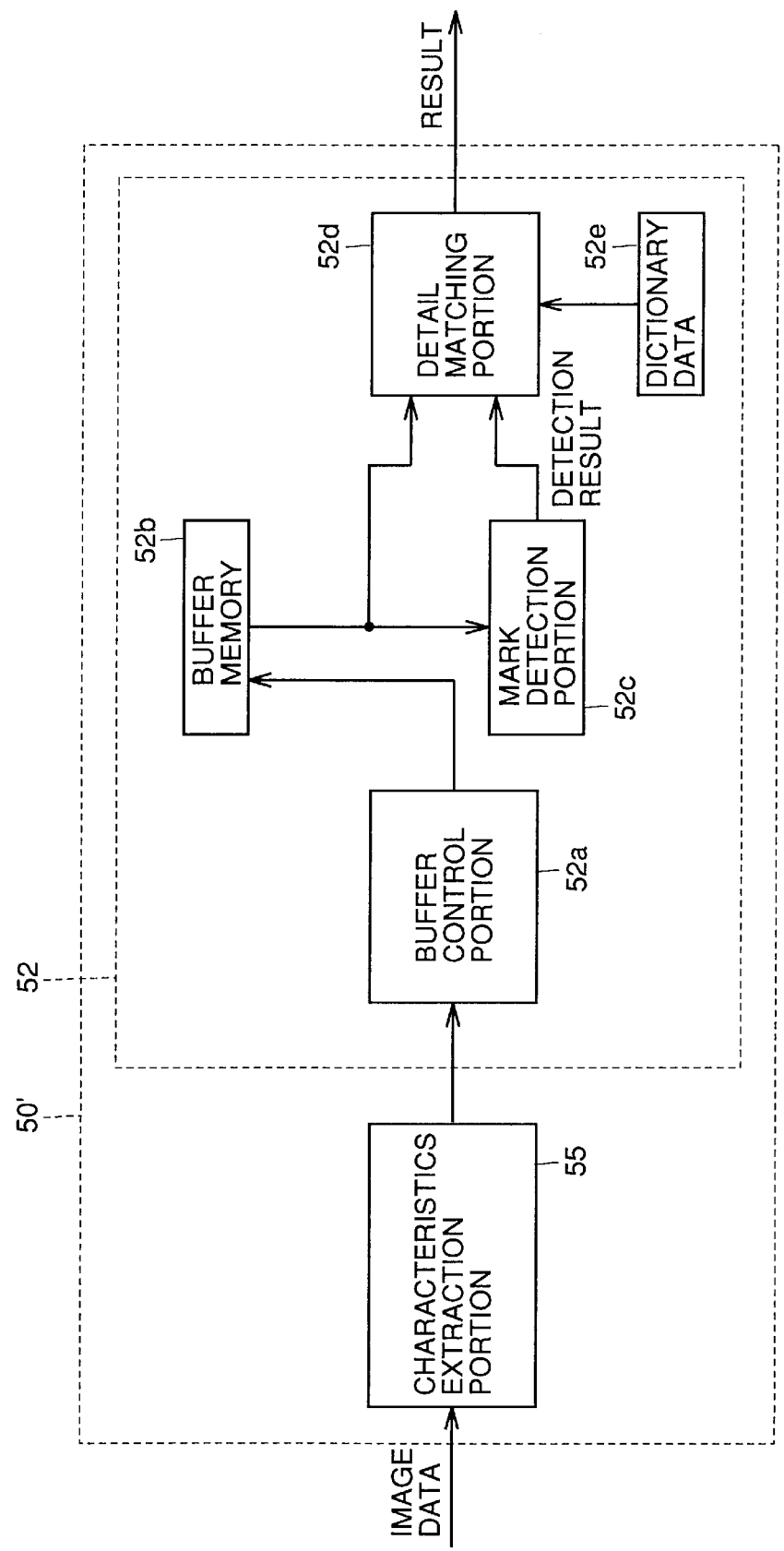
FIGS. 26 and 27 are diagrams showing other examples of the recognizing apparatus according to the second embodiment of the invention.

Since the circuit scale of the recognizing portion increases if gray data (multi-value data having 256 tones, for example) is used as is as described above, a characteristic amount extraction portion 55 may be provided in the preceding stage to recognizing portion 52 as shown in recognizing apparatus 50' in FIG. 26, in order to reduce the number of pieces of data to be processed. As an example of such characteristic amount extraction, edge extraction or color separation using a window comparator may be performed for binarization. Various other characteristic amount extraction processes may be employed.

Figure 27:
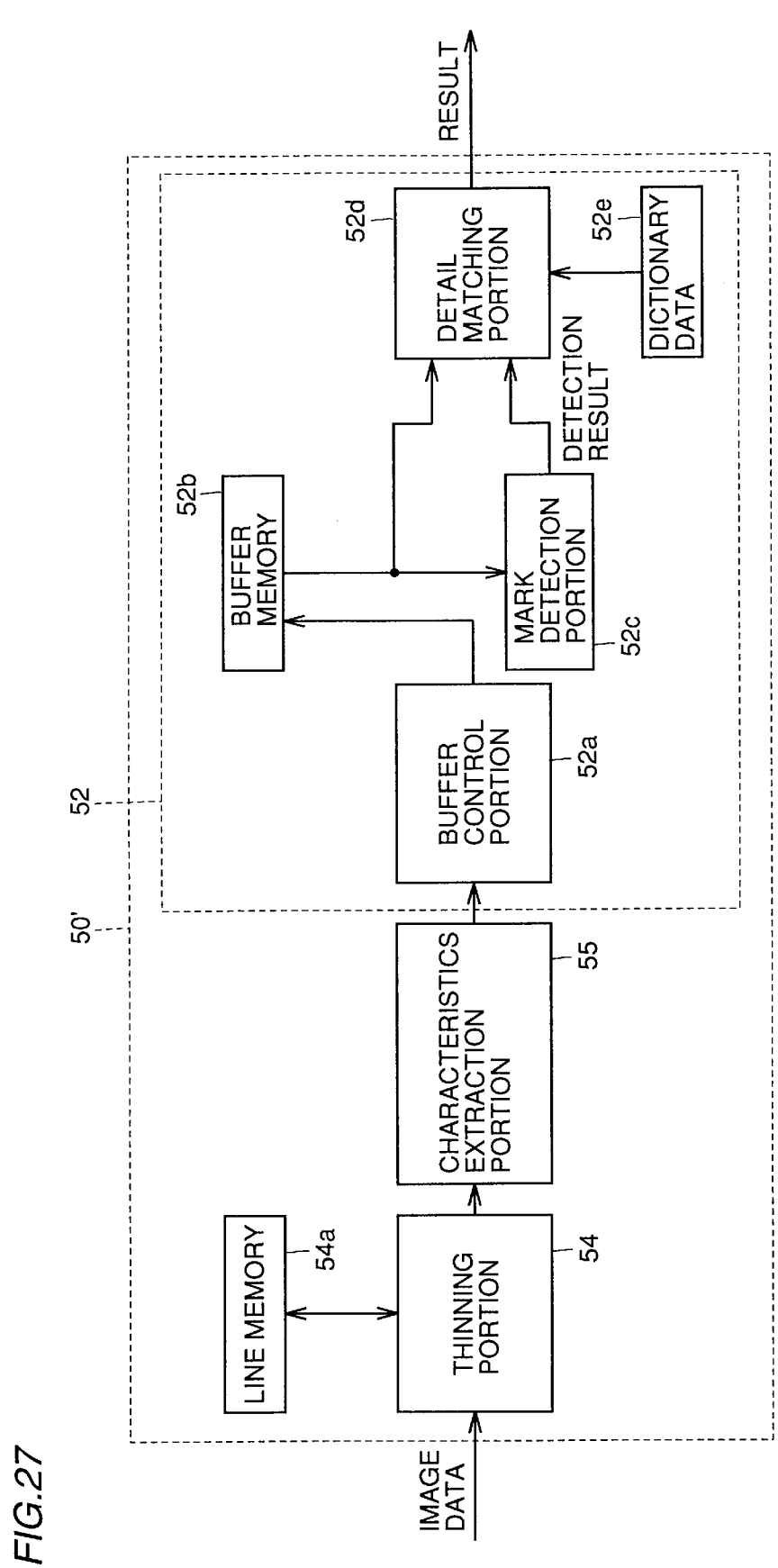

Furthermore, by combining the two structures (FIGS. 24 and 26), as shown in FIG. 27, image data (multi-value data having 256 tones, for example) having its resolution degraded by a thinning process at thinning portion 54 may be sent to characteristic amount extraction portion 55, where image data obtained by characteristic amount extraction may be applied to recognizing portion 52.

Figure 28:
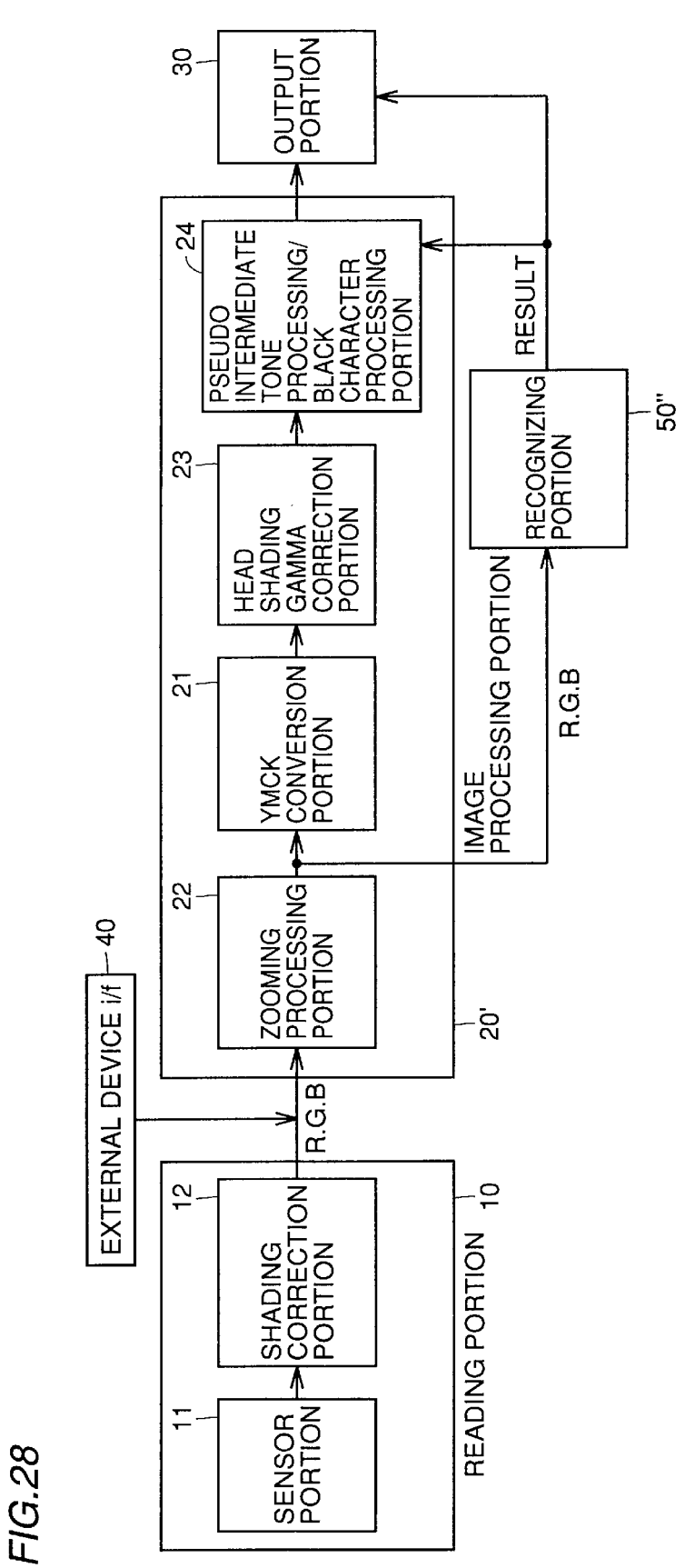
FIG. 28 is a diagram showing an example of a recognizing apparatus according to a third embodiment of the invention.

FIG. 28 shows a third embodiment of the invention. According to the third embodiment, image processing portion 20' is provided inside with a YMCK conversion portion 21 in the succeeding stage to zooming processing portion 22, zooming processing is performed based on RGB data, and 64 or 128-dot RGB data after the zooming processing is converted into YMCK data. The other structure, function and effect are the same as those of the above-described embodiments, the same portions are denoted with the same reference characters and a detailed description thereof is not provided.

In this configuration, the output of zooming processing portion 22 is applied to recognizing apparatus 50". As a result, recognizing apparatus 50" is provided with RGB data. Note that for recognizing processing in recognizing apparatus 50", data to be processed is changed to RGB data, details of the processing may be the same as that of each of the above-described embodiments (particularly that of the second embodiment), a detailed description thereof is not provided.

Although not shown, in such image processing portion 20' (which YMCK-converts after zooming processing), the output of YMCK conversion portion 21 is applied to the recognizing apparatus, a signal output from YMCK conversion portion 21 is equivalent to a signal output from zooming processing portion 22 according to the second embodiment, the recognizing apparatus according to the second embodiment may be applied as is. Similarly, if the output of image processing portion 20' is applied to the recognizing apparatus, a signal output from image processing portion 20' is equivalent to a signal output from image processing portion 20 according to the first embodiment, and therefore the recognizing apparatus according to the first embodiment may be applied as is.

Note that in the above embodiment of the invention, image data applied to image processing portions 20 and 20' is RGB data, but the present invention is not limited to this, a signal other than RGB data, such as a YMC or YMCK signal may be employed, and any signal capable of specifying color information may be employed.

Industrial Applicabilities

As in the foregoing, in a method and an apparatus for recognizing images according to the present invention, and in a copying machine and a printer using the same, recognizing processing is performed based on image data after a zooming operation, and therefore the kind of image data may be advantageously limited to two kinds regardless of the magnification, which makes operations easier.

Thus, even in the ink jet type apparatus which reads (receives from the outside) data on the basis of a strip-shaped region smaller than the entire original, or in a copying machine and a printer which produces and outputs printing data based on the applied image data, image data including a particular image may be surely detected.

What is claimed is:

1. An image recognizing apparatus for recognizing a predetermined image, the apparatus comprising:
   an input for receiving regions of image data, each of said regions being strip-shaped image data representing less than one original page of image data;
   a recognizing portion for searching said strip-shaped image data for said predetermined image such that a first search operation is performed when a first plurality of said regions is received by said recognizing portion and such that a second search operation is performed when a second plurality of said regions is received by said recognizing portion, wherein at least one region searched in said second search operation is also searched in said first search operation; and
   an output for outputting a control signal having an effect on a printing operation based upon a result of said searching performed by said recognizing portion.

2. An image recognizing apparatus for recognizing a predetermined image, the apparatus comprising:
   an input for receiving regions of image data, each of said regions being strip-shaped image data that has been subjected to zooming processing, said strip-shaped image data representing less than one original page of image data;
   a recognizing portion for searching said strip-shaped, zooming processed image data for said predetermined image such that a first search operation is performed when a first plurality of said regions is received by said recognizing portion and such that a second search operation is performed when a second plurality of said regions is received by said recognizing portion, wherein at least one region searched in said second search operation is also searched in said first search operation; and
   an output for outputting a control signal having an effect on a printing operation based upon a result of said searching performed by said recognizing portion.

3. An image processing system, comprising:
   an image reading portion for reading strip-shaped regions of an entire image reading region;
   an image processing portion for producing and outputting printing data based on image data output from the image reading portion; and
   an image recognizing apparatus for recognizing a predetermined image present in said read image data, said image recognizing apparatus comprising:
      an input for receiving said strip-shaped regions, each of said strip-shaped regions being strip-shaped image data representing less than one original page of image data;
      a recognizing portion for searching said strip-shaped image data for said predetermined image such that a first search operation is performed when a first plurality of said regions is received by said recognizing portion and such that a second search operation is performed when a second plurality of said regions is received by said recognizing portion, wherein at least one region searched in said second search operation is also searched in said first search operation; and
      an output for outputting a control signal having an effect on a printing operation based upon a result of said searching performed by said recognizing portion.

4. The image processing system of claim 3, wherein said input of said image recognizing apparatus is configured to receive strip-shaped image data that has been subjected to zooming processing, said strip-shaped image data representing less than one original page of image data.

5. An image processing system, comprising:
   an image processing portion for receiving image data and producing and outputting printing data based on the received image data; and
   an image recognizing apparatus for recognizing a predetermined image present in said received image data, said image recognizing apparatus comprising:
      an input for receiving regions of image data, each of said regions being strip-shaped image data representing less than one original page of image data;
      a recognizing portion for searching said strip-shaped image data for said predetermined image such that a first search operation is performed when a first plurality of said regions is received by said recognizing portion and such that a second search operation is performed when a second plurality of said regions is received by said recognizing portion, wherein at least one region searched in said second search operation is also searched in said first search operation; and
      an output for outputting a control signal having an effect on a printing operation based upon a result of said searching performed by said recognizing portion.

6. The image processing system of claim 5, wherein said input of said image recognizing apparatus is configured to receive strip-shaped image data that has been subjected to zooming processing, said strip-shaped image data representing less than one original page of image data.

7. The image processing system of claim 3 or 5, wherein said image recognizing apparatus further comprises a binary to multi-value conversion portion between said input and said recognizing portion for converting binary data to multi-value image data.

8. The image processing system of claim 7, wherein said image recognizing apparatus searches image data that has been subjected to a zooming process.

9. The image processing system of claim 7, wherein said image processing system is included in a copy machine.

10. The image processing system of claim 7, wherein said image processing system is included in a printer.

11. The image processing system of claim 3 or 5, wherein said strip-shaped image data is a signal to specify a color component.

12. The image processing system of claim 11, wherein said image processing system is included in a copy machine.

13. The image processing system of claim 11, wherein said image processing system is included in a printer.

14. The image processing system of claim 3 or 5, wherein said image processing system is included in a copy machine.

15. The image processing system of claim 5, wherein said image processing system is included in a printer.

16. A method for recognizing a predetermined image, said method comprising:

receiving regions of image data, each of said regions being strip-shaped image data representing less than one original page of image data;

searching said strip-shaped image data for said predetermined image such that a first search operation is performed when a first plurality of said regions is received and such that a second search operation is performed when a second plurality of said regions is received, wherein at least one region searched in said second search operation is also searched in said first search operation; and outputting a control signal for effecting a printing operation based upon a result of said act of sequentially searching.

17. The method of claim 16, wherein said act of sequentially searching comprises sequentially searching multi-image data that has been through a zooming process.

18. The method of claim 16 further comprising reading an image on the basis of a strip-shaped small region for an entire image reading region.

19. The method of claim 16, wherein said act of sequentially searching comprises sequentially searching image data formed of a signal specifying a color component.

20. The method of claim 19, wherein said image data is selected from the group consisting of YMC data and YMCK data.

* * * * *

UNITED STATES PATENT AND TRADEMARK OFFICE
CERTIFICATE OF CORRECTION

PATENT NO. : 6,519,364 B1
DATED : February 11, 2003
INVENTOR(S) : Junji Hiraishi It is certified that error appears in the above-identified patent and that said Letters Patent is hereby corrected as shown below:

<u>Title page,</u>
Item [56], References Cited, FOREIGN PATENT DOCUMENTS, insert the following:
-- EP   0 485 369 A2   5/1992
EP      0 522 769 A1   1/1993
EP      0 585 028 A1   3/1994
EP      0 609 008 A1   8/1994
EP      0 614 307 A1   9/1994
GB     2 282 445       4/1995
EP      0 665 477 A2   8/1995 --

Signed and Sealed this

Seventh Day of October, 2003

JAMES E. ROGAN
*Director of the United States Patent and Trademark Office*